US010974990B2

(12) United States Patent
Da et al.

(10) Patent No.: US 10,974,990 B2
(45) Date of Patent: Apr. 13, 2021

(54) ULTRATHIN CHEMICALLY TOUGHENED GLASS ARTICLE AND METHOD FOR THE PRODUCTION OF SUCH A GLASS ARTICLE

(71) Applicant: SCHOTT Glass Technologies (Suzhou) Co. Ltd., Jiangsu (CN)

(72) Inventors: Ning Da, Jiangsu (CN); Feng He, Jiangsu (CN); Pengxiang Qian, Shanghai (CN)

(73) Assignee: SCHOTT GLASS TECHNOLOGIES (SUZHOU) CO. LTD., Jiangsu (CN)

( * ) Notice: Subject to any disclaimer, the term of this patent is extended or adjusted under 35 U.S.C. 154(b) by 417 days.

(21) Appl. No.: 15/456,150

(22) Filed: Mar. 10, 2017

(65) Prior Publication Data

US 2017/0183259 A1 Jun. 29, 2017

Related U.S. Application Data

(63) Continuation of application No. PCT/CN2015/089411, filed on Sep. 11, 2015, which (Continued)

(51) Int. Cl.
*C03C 21/00* (2006.01)
*C03C 15/02* (2006.01)
(Continued)

(52) U.S. Cl.
CPC ............ *C03C 21/002* (2013.01); *C03C 3/091* (2013.01); *C03C 3/093* (2013.01); *C03C 4/18* (2013.01);
(Continued)

(58) Field of Classification Search
CPC .... C03C 21/002; C03C 19/00; C03B 33/0215
See application file for complete search history.

(56) References Cited

U.S. PATENT DOCUMENTS 3,089,801 A * 5/1963 Tierney ............ B32B 17/10018 428/332
6,815,070 B1 11/2004 Bürkle
(Continued)

FOREIGN PATENT DOCUMENTS

CN 101391860 3/2009
CN 102092940 6/2011
(Continued)

OTHER PUBLICATIONS

Gross et al., Sharp Contact Damage in Ion-Exchanged Cover Glass, Jan. 6-13, 2013 (Year: 2013).*
(Continued)

*Primary Examiner* — Hoa (Holly) Le
(74) *Attorney, Agent, or Firm* — Ohlandt, Greeley, Ruggiero & Perle. L.L.P.

(57) ABSTRACT

A method for producing an ultrathin chemically toughened glass article is provided that includes: providing an ultrathin glass sheet with a first surface and a second surface joined by at least one edge, having a thickness between the first and the second surface, chemically toughening the ultrathin glass sheet to produce an ultrathin toughened glass article. The method includes applying an edge pre-treatment to the at least one edge, preferably all edges, of the ultrathin glass sheet prior to the chemical toughening in order to reduce and/or blunt edge defects and to increase resistance to breakage of the ultrathin glass sheet during the chemical toughening.

35 Claims, 6 Drawing Sheets

Related U.S. Application Data is a continuation of application No. PCT/CN2014/086359, filed on Sep. 12, 2014.

(51) Int. Cl.

| | |
|---|---|
| ***C03C 3/091*** | (2006.01) |
| ***C03C 3/093*** | (2006.01) |
| ***C03C 23/00*** | (2006.01) |
| ***C03C 4/18*** | (2006.01) |
| *B65H 18/28* | (2006.01) |

(52) U.S. Cl.

CPC .......... *C03C 15/02* (2013.01); *C03C 23/0025* (2013.01); *B65H 18/28* (2013.01); *B65H 2801/61* (2013.01); *C03C 2204/00* (2013.01)

(56) References Cited

U.S. PATENT DOCUMENTS

| | | | | |
|---|---|---|---|---|
| 9,908,730 | B2 * | 3/2018 | Ortner | B65H 20/00 |
| 2002/0108400 | A1 | 8/2002 | Watanabe | |
| 2010/0009154 | A1 | 1/2010 | Allan | |
| 2011/0165393 | A1 | 7/2011 | Bayne | |
| 2013/0202715 | A1 | 8/2013 | Wang | |
| 2014/0050911 | A1 | 2/2014 | Mauro | |
| 2014/0298863 | A1 * | 10/2014 | Markham | C03B 21/00 65/176 |
| 2016/0002103 | A1 * | 1/2016 | Wang | C03C 15/00 428/141 |
| 2017/0183259 | A1 | 6/2017 | Da | |
| 2019/0062200 | A1 * | 2/2019 | He | C03C 17/002 |
| 2020/0010357 | A1 * | 1/2020 | He | C03C 17/3405 |
| 2020/0102245 | A1 * | 4/2020 | Da | C03C 3/089 |
| 2020/0109079 | A1 * | 4/2020 | Da | C03C 21/002 |

FOREIGN PATENT DOCUMENTS

| | | | |
|---|---|---|---|
| CN | 102690059 | 9/2012 | |
| CN | 102741187 | 10/2012 | |
| JP | 2002150546 | 5/2002 | |
| JP | 2018188360 | 11/2018 | |
| TW | 201414687 | 4/2014 | |
| WO | 2012126394 | 9/2012 | |
| WO | 2014013996 | 1/2014 | |
| WO | WO-2014045809 A1 * | 3/2014 | C03C 3/085 |
| WO | 2014139147 | 9/2014 | |

OTHER PUBLICATIONS

Corning® Gorilla GlassTM (Code 2318) Chemical tempering procedures—Technical Materials, Sep. 2007. (Year: 2007).*

Svenson et al., Effects of Thermal and Pressure Histories on the Chemical Strengthening of Sodium Aluminosilicate Glass, Front. Mater., Mar. 16, 2016 (Year: 2016).*

Svenson et al ("Effects of Thermal and Pressure Histories on the Chemical Strengthening of Sodium Aluminosilicate Glass", Frontiers in Materials, Mar. 2016, vol. 3, Article 14), (Year: 2016).*

International Search Report dated Dec. 23, 2015 for corresponding PCT/CN2015/089411, 7 pages.

Written Opinion of the International Searching Authority dated Dec. 23, 2015 for corresponding PCT/CN2015/089411, 7 pages.

International Preliminary Report on Patentability dated Mar. 14, 2017 for corresponding PCT/CN2015/089411, 7 pages.

International Search Report dated Jun. 10, 2015 for corresponding PCT/CN2015/086359, 5 pages.

Written Opinion of the International Searching Authority dated Jun. 10, 2015 for corresponding PCT/CN2015/086359, 8 pages.

International Preliminary Report on Patentability dated Mar. 14, 2017 for corresponding PCT/CN2015/086359, 9 pages.

* cited by examiner

Fig. 3a
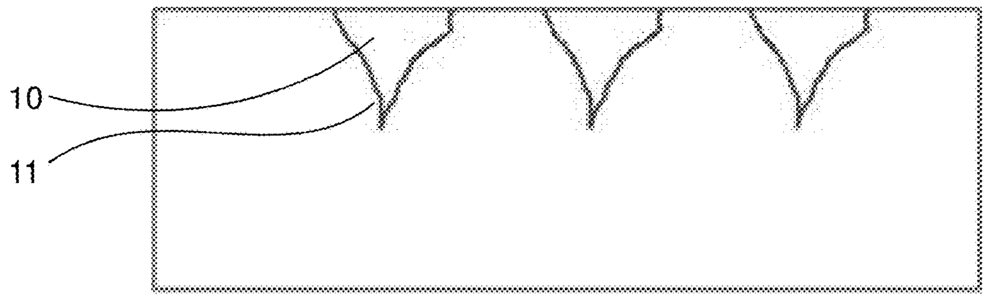
Fig. 3b
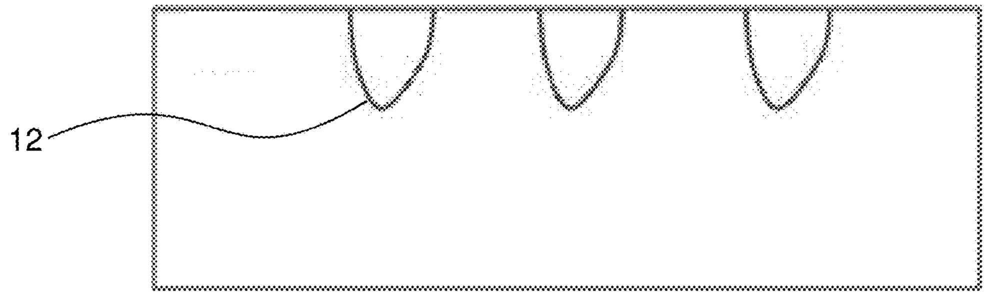
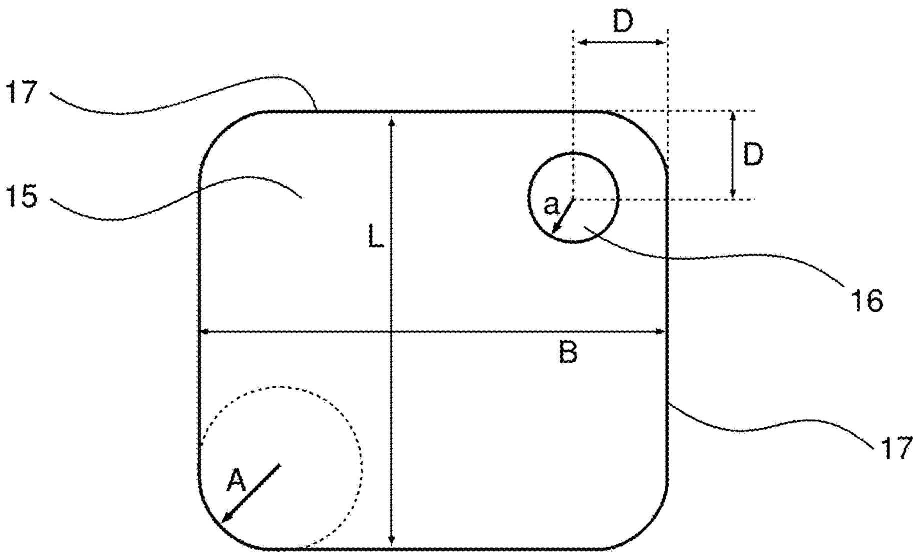
Fig. 4

ULTRATHIN CHEMICALLY TOUGHENED GLASS ARTICLE AND METHOD FOR THE PRODUCTION OF SUCH A GLASS ARTICLE

CROSS REFERENCE TO RELATED APPLICATIONS

This application is a continuation of International Application No. PCT/CN2015/089411 filed on Sep. 11, 2015 and is a continuation of International Application No. PCT/CN2014/086359 filed on Sep. 12, 2014, the entire contents of all of which are incorporated herein by reference.

BACKGROUND

1. Field of Invention

The invention concerns a method for producing an ultrathin chemically toughened glass article, comprising providing an ultrathin glass sheet with a first surface and a second surface joined by at least one edge, having a thickness between the first and the second surface, and chemically toughening the ultrathin glass sheet to produce an ultrathin chemically toughened glass article. The invention further concerns an ultrathin chemically toughened glass article and an ultrathin glass sheet as semi-finished product for the use in a method for producing an ultrathin chemically toughened glass article.

2. Description of Related Art

The market of consumer electronics often requires thinner and thinner glass articles to keep minimizing the volume and weight of the final product. Here and in the following, the terms “glass” and “glasses” include both glasses and glass ceramics.

Thin glass can be obtained by grinding a thicker glass such as e.g. a borosilicate glass to the desired thickness. However, sheet thicknesses lower than 0.5 mm are difficult to achieve by grinding and polishing of thicker glass sheets. Glass thinner than 0.3 mm, or even with a thickness of 0.1 mm, such as D263®, MEMpax® available from SCHOTT®, can be produced by down-drawing methods. Also, soda lime glass with a thickness of 0.1 mm can be produced by special float processes. Unlike thicker glasses, the handling and processing of ultrathin glass sheets is difficult since with decreasing thickness, the strength of the glass is getting lower and lower resulting in an increasing probability of breakage.

A major challenge for applying thin or ultrathin glass substrates in electronic appliances therefore lies in the difficult handling of ultrathin glass sheets during production and processing. For thin glasses, some methods have been proposed to overcome these difficulties. U.S. Pat. No. 6,815,070 proposes coating thin glass with organic or polymer films to improve the resistance to breakage of the glass sheet. There are, however, disadvantages in this method since e.g. the improvement in strength is not sufficient and cutting of the coated glass sheets requires adopting special processes. In addition, the polymer coating has disadvantages regarding thermal durability and optical properties of the glass.

A well-known method for strengthening glasses is the chemical toughening of glass, in particular establishing a surface compressive stress by introduction of larger ions via ion-exchange. US 2010/0009154 e.g. describes a thick glass of 0.5 mm or thicker with an outer region of compressive stress with a depth of at least 50 μm achieved by ion-exchange in a surface layer. The compressive stress is at least 200 MPa. The step of forming a central tensile stress (CT) and the compressive stress in the surface region comprises successively immersing at least a portion of the glass in a plurality of ion-exchange baths. It has been shown that, similar to thick glasses, thin and ultrathin glasses can also be strengthened via chemical ion-exchange (e.g. US2014/050911 or PCT/CN2013/072695).

Unlike thicker glasses, however, the yield of chemical toughening for ultrathin glasses is comparatively poor. This is a direct result of the increasing probability of breakage of glass sheets during the chemical toughening as the thickness of the glass is decreased. On the one hand, surface compressive stress can help ultrathin glass to resist e.g. mechanical impact by hitting or striking from the outside. On the other hand, the extra surface compressive stress in ultrathin glasses can lead to self-breakage or can make the glass prone to breakage during handling or the chemical toughening. Changes in clamping forces due to different thermal expansion of the clamps and the glass sheets during toughening can e.g. easily induce breakage. The thinner the glass sheet gets, the more severe these problems become.

At the same time, it is a constant requirement e.g. in the market of consumer electronics, in particular in respect of wearable devices as e.g. smart phones or tablets, to provide glass articles with very high bending strengths and durability which can resist the mechanical stress and impacts occurring during daily use. In view of the desired reduction in volume and weight, there is a demand for ultrathin glass articles which have the necessary strength and flexibility e.g. for sufficient protection of the underlying components.

It is therefore an object of the invention to provide an ultrathin toughened glass article and a method for producing such a glass article, which overcome the above-mentioned disadvantages. In particular, it is the object of the invention to provide an ultrathin toughened glass article which has an improved lifespan and which can be easily and cost effectively produced and a method for producing such a glass article. It is another object of the invention to provide an ultrathin toughened glass article and a method for producing such a glass article that allow for a high yield, in particular during chemical toughening. It is a further object of the invention to provide an ultrathin glass article that has a high durability, in particular under mechanical stress, and a method for producing such a glass article.

SUMMARY

The following terminologies and abbreviations are adopted herein:

The term “glass article” is used in its broadest sense to include any object made of glass and/or glass ceramics. As used herein, ultrathin glass refers to glasses and glass articles with a thickness of equal or less than 0.4 mm, unless otherwise specified. The glasses suited for the invention are ion-exchangeable or can be otherwise chemically strengthened by known means in the art. The glass compositions are optimized for ultrathin forming and applications requiring ultrathin glasses as e.g. described in PCT/CN2013/072695 by SCHOTT®.

Compressive stress (CS): the stress that results from extrusion effect on glass network by glass surface after an ion-exchange while no deformation occurs in the glass. CS can be measured by the commercially available stress measuring instrument FSM6000 based on an optical principle.

Depth of ion-exchanged layer (DoL): the thickness of the glass surface layer where ion-exchange occurs and compressive stress is produced. DoL can be measured by the commercially available stress measuring instrument FSM6000 based on an optical principle.

Central tensile stress (CT): the tensile stress that is generated in the interlayer of glass and counteracts the compressive stress that is generated between the outer surfaces of the glass after ion-exchange. The CT can be calculated from the measured CS and DoL.

Average surface roughness ($R_a$): the average surface roughness, or simply surface roughness herein, $R_a$ is the arithmetic mean of surface deviations within a sampling length. $R_a$ can e.g. be measured by an atomic force microscope.

Strength of materials ($\sigma$): the maximum stress that materials are able to bear before breakage. $\sigma$ can be measured by three point bending or four point bending tests.

The objects of the invention are solved by an ultrathin chemically toughened glass article, an ultrathin glass sheet for the use as a semi-finished product in a method for producing an ultrathin chemically toughened glass article and a method for producing an ultrathin chemically toughened glass article according to the independent claims.

The method for producing an ultrathin chemically toughened ultrathin glass article comprises: providing an ultrathin glass sheet with a first surface and a second surface joined by at least one edge, having a thickness t between the first and the second surface, chemically toughening the ultrathin glass sheet to produce a toughened ultrathin glass article.

The method is characterized in that an edge pre-treatment is applied to the at least one edge of the ultrathin glass prior to the chemical toughening in order to reduce edge defects and to increase resistance to breakage of the ultrathin glass sheet during the chemical toughening. The pre-treatment is preferably applied to all edges of the ultrathin glass sheet.

The invention is based on the insight that the relatively poor yield during the chemical toughening of ultrathin glasses with thicknesses of 0.4 mm or less is mostly due to a limited mechanical strength of the glass sheets prior or during the toughening procedure. The limited mechanical strength is mostly due to defects on the edges which can further propagate under the effect of an extra surface compressive stress induced by the chemical toughening. The strength is described by $$\sigma_f \sim \sqrt{\frac{E\xi}{r_0}}$$

where E is Young's modulus and $\xi$ is the surface energy, $r_0$ is accepted as the internal defect size. When the external strength is higher than the critical failure strength $\sigma_f$, catastrophic failure happens i.e. the glass breaks. By a toughening treatment of the glass, which can essentially be either physically toughening or chemically toughening, a surface compressive stress can be induced on the in the glass, which assist to increase the strength of glasses. The strength then becomes $$\sigma_f \sim \sqrt{\frac{E(\xi + \xi_o)}{r_o}}$$

where $\xi_o$ is an additive stress. Physical toughening, however, is only suitable for glasses with a thickness larger than 3.0 mm. Chemical toughening can be achieved by ion-exchange which is suitable for e.g. alkali containing glasses regardless of the thickness of glass and is most effective for thin glass, such as thicknesses less than 2.0 mm. The above formula shows that, under the same internal defect size, the critical failure strength of is significantly increased by the toughening. In other words, the internal defects can be larger without inducing breakage of the glass. Essentially, toughening glasses is aimed to add one extra force to restrict the threshold of critical failure strength and defect size. After chemically toughening, the strength of the glass is significantly increased and can be more than 10 times higher than prior to the toughening.

Such defects are usually introduced by scribing or cutting the ultrathin glass sheet from e.g. a larger glass sheet or a glass ribbon by e.g. a Penett diamond scribing wheel, high penetration polycrystalline diamond scribing wheel, no teeth diamond scribing wheel, and diamond tip are employed to do scribing. The parameters such as number of teeth, depth of teeth, and wheel angle needs to be adjusted regarding to the type and thickness of the ultrathin glasses.

During toughening, the ultrathin glass sheet needs to be held in place which is usually achieved by a toughening holder. The clamping force between the toughening holder and the ultrathin glass sheet may increase as a result of the different thermal expansion coefficients of sample holder and the sheet. As a result, the cracks and chippings on the edge of an as-cut ultrathin glass sheet may propagate and induce the breakage of the sheet during toughening. Therefore, an edge pre-treatment, such as e.g. edge polishing or etching by acids according to the invention is therefore employed to reduce the cracks or chippings at the cutting edges of the ultrathin glass. The strengths of glasses are also related to the geometry of the defects, besides their size. The stress concentrates at the points of minimum curvature of the defects: The less curvature, the higher the stress. It is therefore preferred that the pre-treatment involves a treatment that, on the one hand, reduces the size of the defects and, on the other hand, also smoothens or blunts the defects in order to remove sharp edges. The edge pre-treatment can advantageously be applied only to the at least one edge or the edges of the ultrathin glass sheet whereby the surfaces remain essentially untreated. It has been found that, by applying the pre-treatment only to the edge(s), in particular the toughening yield can be significantly increased. The pre-treatment thereby can extend to narrow regions on the surfaces which immediately border the edge(s) in order for the pre-treatment to fully cover the edge(s) whereby the surfaces themselves remain essentially untreated.

The edge pre-treatment according to the invention has shown that the yield of toughening ultrathin glass sheets can be increased from usually at most 85% up to 95% or even larger values, dependent on the shape of the sheet, glass type and method of pre-treatment applied. Surprisingly, for ultrathin glass sheets with holes and rounded corners, the toughening yield is increased from usually about only 15% to above 75%. Generally, the yield during chemical toughening is therefore advantageously larger than 75%, preferably larger than 80%, more preferably larger than 85%, even more preferably larger than 90% and most preferably larger than 95%.

Preferentially, the method also comprises a post-treatment which is applied at least to the at least one edge, preferably to all edges, of the toughened ultrathin glass article after the chemical toughening in order to further reduce edge defects and to strengthen the toughened ultrathin glass article.

It has been found that during the chemical toughening, new flaws and defects can arise at the previously treated edges of the glass sheet. Such flaws reduce the strength of the ultrathin toughened glass article. By applying a post-treatment after the toughening, the new flaws as well as potentially remaining old cracks or chippings can be smoothened or blunted and/or reduced in size. In doing so, the ultrathin toughened glass article gains a significant increase in strength. The post-treatment can therefore also advantageously be applied to the surface or surface areas of the toughened glass article since during/after the toughening, nanoscale flaws may emerge at the surface of the ultrathin glasses. If it is required, it is also possible to apply the post-treatment only to surface areas and not to the edges of the toughened glass article. In this case, however, the improvement in strength is usually rather limited.

If the post-treatment is applied to surface areas, the amount of material removed must be carefully considered since the toughened ultrathin glass has a surface compressive stress and an ion-exchanged layer of a certain depth. If the removed amount is too large, the compressive stress will reduce too much, resulting in a decrease of strength. It has been found that generally removing around 10% of the DoL is an optimal amount for toughened ultrathin glasses. Dependent on the specific requirements of the glass article, however, deviations from this value might also be advantageous.

It has been found, that the additional post-treatment of the ultrathin chemically toughened glass article can significantly increase the strength of the finished glass article by surprisingly large factors. The following table gives an overview of the increase in strength of an edge (pre)treated-toughened-(post)treated (ETE) glass article as described herein compared to glasses with the same shape and dimensions without post-treatment:

| ETE compared to | Increase in strength (factor) |
|---|---|
| as-cut (RAW) | 3-8 |
| only toughened (T) | 1.5-4 |
| edge pre-treatment and toughened (ET) | 1.2-1.5 |

The increase in strength thereby depends on the type of the glass. The method according to the invention including the post-treatment can therefore result in a strength of the chemically toughened glass article that is larger by a factor of 3 up to a factor of 8 compared to the raw and untreated ultrathin glass sheet.

Preferably, the average surface roughness during the edge pre-treatment and/or, if applicable, the post-treatment is reduced in the treated areas to less than 10 μm, preferably less than 5 μm, more preferably less than 2 μm, even more preferably less than 1 μm and most preferably less than 0.5 μm.

The amount of material removed by the edge pre-treatment and/or, if applicable, the post-treatment can thereby be less than 25.0 μm, preferably less than 10.0 μm, more preferably less than 4.0 μm, even more preferably less than 1 μm and most preferably less than 0.5 μm. As pointed out in the above, the amount removed must be carefully considered in particular in the case that the post-treatment is also applied to surfaces or surface areas having a compressive stress and an ion-exchange layer.

It has been found that most preferably the edge pre-treatment for ultrathin glasses is a chemical treatment, in particular etching the ultrathin glass sheet or article with an acidic solution. A chemical etching method is cheap and easy to be carried out due to the simple equipment required. Furthermore, etching areas can easily be controlled by protecting those areas that do not need to undergo the etching from the acid. For the edge pre-treatment prior to the chemical toughening of the ultrathin glass sheet, only the edges need to be etched and the center area of ultrathin glass sheet can be protected to avoid any change of properties of the sheet. During the post-treatment, the edges and/or surface(s) or surface areas of the glass article can be etched.

Another advantage of etching is that sharp flaws of as-cut ultrathin glasses will be blunted. The stress will therefore decrease significantly which benefits the toughening yield for ultrathin glasses, especially for glasses with holes or rounded corners (see also below). Considering the stress related to the flaw size and the curvature of flaws, there is a certain balance because the etching also increases the size of flaws to some extent by blunting them.

The etching treatment has a distinct efficiency to enhance the strength of different glass types with different compositions. The reaction between a given acid and the glass therefore can result in e.g. different salts. The solubility of the salts influences the surface quality or surface chemistry of the etched glasses. The improvement of strength for different glass types can therefore be different dependent of a given etching setup. Therefore, applying the pre-etching process to different ion-exchangeable glasses may require adjusting/optimizing the etching solutions and etching parameters.

Preferably, the acidic solutions comprise one or more of the following HF, $H_2SO_4$, HCl, $NH_4HF_2$ in aqueous solution. These acidic solutions can be combined with further pH<7 solutions. The concentration of Hydrogen ions in the acidic solution can be less than 25 mol/L, preferably less than 5 mol/L, more preferably less than 1 mol/L and most preferably less than 0.1 mol/L. These etching conditions have proven to be particularly advantageous with the further below mentioned glass compositions. It becomes immediately clear that these etching conditions can also be applied to other glass types or that other etching conditions can also be advantageous, dependent on the specific requirements.

Dependent on the specific circumstance, an edge pre-treatment comprising a high-temperature treatment can be preferred, in particular a high temperature treatment comprising a laser treatment. Conventional laser cutting by continuous wave (CW) lasers such as e.g. $CO_2$ and common green light lasers is achieved by a rapid heating by the laser followed by a fast quenching, resulting in glass breaking and thus separation. Direct laser vaporization with a high energy laser is also possible. Both processes, however usually lead to unwanted micro cracks and a rough surface finish. Unconventional laser cutting, however, is preferred and is based on filaments of ultra-short laser pulses, wherein the laser pulses are of nanosecond duration or less, i.e. picosecond, femtosecond or even attosecond duration. Such lasers can cut brittle materials via plasma dissociation induced by filamentation or self-focusing of the pulsed laser. The unconventional laser cutting process produces high quality cutting edges with low surface roughness and can therefore be employed e.g. for the edge pre-treatment. In this case, the edge pre-treatment can be achieved directly during the cutting of the ultrathin glass article from e.g. a glass sheet or a coiled glass ribbon.

Alternatively, the edge pre-treatment can comprise a mechanical treatment which in particular comprises a polishing treatment. The polishing is applied on the edge of the ultrathin glass sheet prior to the chemical toughening. Since polishing of the edges is difficult to achieve with single sheets of ultrathin glass, the edge treatment can e.g. be done by stacking several ultrathin glass sheets with abutting surfaces. The method therefore preferably comprises forming a stack of several ultrathin glass sheets and applying the polishing treatment to a side of the stack of ultrathin glass sheets relative to the stacking direction.

Preferably, the average surface roughness after polishing is less than 5 μm, preferably less than 2 μm, more preferably less than 1 μm, even more preferably less than 0.5 μm and most preferably less than 0.2 μm.

The method according to the invention is particularly advantageous for ultrathin glasses or glass articles. The ultrathin glass sheet, and thus the ultrathin toughened glass article, can therefore have a thickness which is equal to or less than 0.4 mm or preferably equal or less than 0.3 mm. The method has proven to be particularly useful with thicknesses equal or less than 0.2 mm or even equal or less than 0.1 mm. The method has also advantageously been applied down to 0.01 mm thickness or even lower.

The ultrathin toughened glass article produced by the method according to the invention is particularly useful in applications as protective films, e.g. for cell phones, tablet computers, laptops, resistance screens, TVs, mirrors, windows, aviation windows, furniture and white home appliances. It is also particularly useful as touch panels, organic light-emitting diodes (OLEDs), organic photovoltaics (OPVs), and fingerprint sensors. The present method therefore is particularly preferred where the ultrathin glass sheet is provided with an essentially rectangular shape, preferably with rounded corners with a corner radius equal or less than 20 mm, preferably equal or less than 10 mm, more preferably equal or less than 8 mm, most preferably equal or less than 6 mm. Such shapes are often used in the above mentioned applications. It is self-evident that the ultrathin glass sheet can also be provided in other shapes as e.g. round or oval shapes, as the specific application requires.

Ultrathin glasses, in particular designed for smart phones and tablets, often need a camera hole or openings for loudspeaker and have rounded corners or similar. Such artificial holes and corners have a remarkable influence on the toughening of ultrathin glasses. Since the artificial holes and corners introduce more flaws or chippings, the surface compressive stress is significantly modified compared with an intact ultrathin glass. The modified compressive stress including the extra flaws may therefore induce the breakage of ultrathin glasses during toughening. It has been found, as already pointed out in the above, that the toughening yield for ultrathin glass article with holes and rounded corners is remarkably increased with the edge pre-treatment according to the invention. The method therefore preferentially comprises providing the ultrathin glass sheet with at least one hole. The hole is understood to penetrate through the first and second surface of the ultrathin glass sheet and usually has a distance from the edges of the glass article. The hole can thereby be circular, rectangular or essentially rectangular, and square or essentially square or can have other, more irregular shapes. The circular holes typically have radii of 20 mm, 15 mm, 12 mm, 10 mm, 8 mm or 5 mm. It is self-evident that the holes can also have other radii, e.g. larger than the above values or smaller, dependent on the specific application. “Essentially rectangular” or “essentially square” in the above in particular refers to rectangular or square holes with rounded corners or other slight deviations from a pure rectangular or square shape. The corner radii typically have values of 4 mm, 3 mm, 2 mm, 1 mm, 0.5 mm. Dependent on the specific application, the rounded corners of the essentially rectangular, essentially square or other essentially polygonal shaped holes can self-evidently also have other radii.

The following glasses with the corresponding compositions are preferred and have shown a high toughening yield when treated with the method according to the invention as well as an excellent increase in strength if the post-treatment is applied. However, the invention is also suited for other compositions and has proven to be advantageous for numerous other glasses and glass ceramics.

A preferred glass used in the method according to the invention is a lithium aluminosilicate glass with the following composition (in wt. %):

| Composition | (wt. %) |
|---|---|
| $SiO_2$ | 55-69 |
| $Al_2O_3$ | 18-25 |
| $Li_2O$ | 3-5 |
| $Na_2O + K_2O$ | 0-30 |
| MgO + CaO + SrO + BaO | 0-5 |
| ZnO | 0-4 |
| $TiO_2$ | 0-5 |
| $ZrO_2$ | 0-5 |
| $TiO_2 + ZiO_2 + SnO_2$ | 2-6 |
| $P_2O_5$ | 0-8 |
| F | 0-1 |
| $B_2O_3$ | 0-2 |

Another preferred glass used in the method according to the invention is a soda lime glass with the following composition (in wt. %):

| Composition | (wt. %) |
|---|---|
| $SiO_2$ | 40-81 |
| $Al_2O_3$ | 0-6 |
| $B_2O_3$ | 0-5 |
| $Li_2O + Na_2O + K_2O$ | 5-30 |
| MgO + CaO + SrO + BaO + ZnO | 5-30 |
| $TiO_2 + ZrO_2$ | 0-7 |
| $P_2O_5$ | 0-2 |

Another preferred glass used in the method according to the invention is a borosilicate glass with the following composition (in wt. %):

| Composition | (wt. %) |
|---|---|
| $SiO_2$ | 60-85 |
| $Al_2O_3$ | 0-10 |
| $B_2O_3$ | 5-20 |
| $Li_2O + Na_2O + K_2O$ | 2-16 |
| MgO + CaO + SrO + BaO + ZnO | 0-15 |
| $TiO_2 + ZrO_2$ | 0-5 |
| $P_2O_5$ | 0-2 |

Another preferred glass used in the method according to the invention is an alkali metal aluminosilicate glass with the following composition (in wt. %):

| Composition | (wt. %) |
|---|---|
| $SiO_2$ | 40-75 |
| $Al_2O_3$ | 10-30 |
| $B_2O_3$ | 0-20 |
| $Li_2O + Na_2O + K_2O$ | 4-30 |
| MgO + CaO + SrO + BaO + ZnO | 0-15 |
| $TiO_2 + ZrO_2$ | 0-15 |
| $P_2O_5$ | 0-10 |

Another preferred glass used in the method according to the invention is a low alkali metal aluminosilicate glass with the following composition (in wt. %):

| Composition | (wt. %) |
|---|---|
| $SiO_2$ | 50-75 |
| $Al_2O_3$ | 7-25 |
| $B_2O_3$ | 0-20 |
| $Li_2O + Na_2O + K_2O$ | 0-4 |
| MgO + CaO + SrO + BaO + ZnO | 5-25 |
| $TiO_2 + ZrO_2$ | 0-10 |
| $P_2O_5$ | 0-5 |

The glasses used in the invention, in particular the above mentioned glasses, can also be modified. For example, the color can be modified by adding transition metal ions, rare earth ions as e.g. $Nd_2O_3$, $Fe_2O_3$, CoO, NiO, $V_2O_5$, $MnO_2$, $TiO_2$, CuO, $CeO_2$, $Cr_2O_3$, and 0-2 wt. % of $As_2O_3$, $Sb_2O_3$, $SnO_2$, $SO_3$, Cl, F, and/or $CeO_2$ into the glass compositions. Such modifying color can either enrich the design of consumer electronics such as color requirements for back covers or can provide an additional function for the ultrathin glass article as e.g. as color filters. In addition, luminescence ions, such as transition metal and rare earth ions can be added in order to endow optical functions, such as optical amplifiers, LEDs, chip lasers etc. In particular, 0-5 wt. % of rare earth oxides can be added to introduce magnetic, photon or optical functions.

The glass article can also be provided with an anti-microbial function by applying an ion-exchange of the glass article in an $Ag^+$-containing salt bath or a $Cu^{2+}$-containing salt bath. After the ion-exchange the concentration of $Ag^+$ or $Cu^{2+}$ is higher than 1 ppm, preferably higher than 100 ppm, and more preferably higher than 1000 ppm. The ultrathin glass with anti-microbial function could be applied for medical equipment such as computer or screen used in hospitals and consumer electronics with anti-microbial function.

Further preferred variations of such glasses can be found in PCT/CN2013/072695 and are hereby incorporated by reference.

The toughening treatment of an ultrathin glass article made from such a glass or other glasses is preferentially achieved by controlling a slow ion-exchange rate during the chemical toughening to achieve a depth of an ion-exchange layer DoL ($L_{DoL}$) of less than 30 μm, a surface compressive stress CS ($\sigma_{CS}$) between 100 MPa and 700 MPa, and a central tensile stress CT ($\sigma_{CT}$) less than 120 MPa, wherein the thickness t, DoL, CS and CT of the toughened ultrathin glass article meet the relationship $$\frac{0.2t}{L_{DoL}} \leq \frac{\sigma_{CS}}{\sigma_{CT}}.$$

Preferably, the chemical toughening includes a slow ion-exchange in a salt bath between 350-700° C. for 15 minutes to 48 hours.

In order to provide the ultrathin glass sheet in the method according to the invention, the ultrathin glass article may e.g. be cut from a larger ultrathin glass sheet. Preferably, the ultrathin glass sheet is cut form a glass ribbon. This glass ribbon may be produced by redrawing a heated glass perform or by drawing from a melt. Useable methods for drawing the ribbon from a melt are down-drawing or overflow-fusion.

The glass ribbon may be stored for some time or transported to another facility prior to cutting the glass sheets for the glass articles according to the invention. The aforementioned drawing processes are particularly effective, if long ribbons are produced. However, the probability of breakage generally increases with the size of a glass article. This is particularly critical if mechanical stress is exerted to the glass article. On the other hand, it is useful to coil up the ribbon so as to reduce the required storage space and to ease handling of the ribbon during storage and transportation. As the ribbon is bent in the coil, the glass is stressed mechanically.

Moreover, if the ribbon withstands the coiling process, breakage may also occur at a later time during storage or transport due to stress-corrosion cracking. Even a single crack, however, will cause problems in the subsequent processing, since the decoiling needs to be interrupted at the crack. Often, a crack may actually render the entire glass ribbon useless.

Thus, it is a further object of the invention to further improve the overall yield for chemical toughening of ultra-thin glasses by optimizing the yield of processing steps prior to the edge pre-treatment and the chemical toughening of the ultra-thin glass sheets.

These process steps generally include providing a glass ribbon and coiling it into a coil. After the coiling, the glass ribbon is decoiled and cut so as to derive glass sheets. These glass sheets are further processed according to the invention by etching and chemical toughening. The coil as an intermediate product is wound in a particular manner to avoid cracks prior to the cutting step. In particular, the bending radius of the coil is chosen in dependence of the length of the ribbon. This is since it has been found that the probability of deferred breakage of the glass ribbon due to, e.g., stress-corrosion cracking increases with the length, in particular with the length of its edges.

Specifically, according to one embodiment of the invention, the method comprising the steps of providing a glass ribbon having a length of at least 10 meters, preferably having a length in the range from 10 to 1000 meters, coiling up the glass ribbon to form a coil with—the core radius or inner radius of the coil being chosen so that the innermost layer is subjected to a tensile stress $A_{app}$, being smaller than $$1.15 \cdot \mathrm{Min}\left(\overline{\sigma}_a - \Delta_a 0.4 \cdot \left(1 - \ln\left(\frac{A_{ref}}{A_{App}}\Phi\right)\right), \overline{\sigma}_e - \Delta_e 0.4 \cdot \left(1 - \ln\left(\frac{L_{ref}}{L_{App}}\Phi\right)\right)\right), \quad (1)$$

where $L_{ref}$ is the edge length and $A_{ref}$ is the surface area of the side faces of glass ribbon samples, $\overline{\sigma}_a$ being the median of the tensile stress of samples of the glass ribbon upon break of the samples, where the break occurs within a side face of the samples, and $\overline{\sigma}_e$ is the median of the tensile stress of samples of the glass ribbon upon break of the samples, where the break emanates from an edge of the samples, $\Delta_e$ and $\Delta_a$ being standard deviations of the tensile stress upon break of the samples at the edge or within a side face of the samples, respectively (i.e. the standard deviations of the median values $\overline{\sigma}_e$, $\overline{\sigma}_a$), $A_{app}$ being the surface area of one side face of the glass ribbon and $L_{app}$ being the cumulated edge length of the longitudinal edges of the glass ribbon, and Φ being a specified maximum rate of breakage within a time interval of at least half a year.

The glass ribbon with the core diameter as specified above is stored after the coiling and subsequently decoiled and cut into glass sheets, the glass sheets then being further processed by the edge pre-treatment, chemical toughening and, as the case may be, the post-treatment, as further described herein.

Preferably, the specified maximum rate of breakage Φ is 0.1 or less. It is particularly preferred that the maximum rate of breakage is even less than 0.05.

However, to facilitate handling of the coil and to obtain space saving dimensions of the coil, it is further preferred that a tensile force of at least 22 MPa is exerted to the innermost layer of the glass ribbon. This way, the inner radius and the overall dimensions of the coil are reduced.

To gain reliable values of the maximum tensile force $\sigma_{app}$ and the corresponding bending radius at the core of the coil, it is important that the edges of the samples have the same quality and properties like the edges of the glass ribbon. In particular, this may be achieved by cutting the samples from the edges of the ribbon so that one edge of the sample is a section of the edge of the ribbon. To obtain the values $\overline{\sigma}_e$ and $\Delta_e$, breaks emanating from another edge which is not a section of the original edge of the glass ribbon are disregarded.

Of course, it is not necessary to test every glass ribbon. In general, one glass ribbon may be used to cut samples, determine the parameters $\overline{\sigma}_e$, $\Delta_e$, $\overline{\sigma}_a$, $\Delta_a$ and then coil up one or more further glass ribbon with a core diameter causing a tensile force being lower than the value defined by the above given term (1).

A suitable break test is a two-point bending test. This test is performed by fixing the samples between two flanges. The flanges are moved towards each other so that the sample bends more and more and eventually breaks. The tensile force upon break may be determined from the bending radius of the sample or indirectly from the distance of the flanges.

To determine the minimum core radius or inner radius from term (1), the following relationship may be used:

$$\sigma_{app} = \frac{E}{1-\nu^2}\frac{t}{2R} \qquad (2)$$

In this equation, E denotes Young's modulus of the glass, □ denotes the Poisson ratio and R denotes the inner radius of the coil.

Often, even longer terms of storage may be considered. To guarantee a low rate of breakage for longer terms such as, e.g., ten years, it is preferred that the tensile force at the innermost layer of the coil is lower than $$0.93\cdot \mathrm{Min}\left(\overline{\sigma}_a - \Delta_a 0.4\cdot\left(1-\ln\left(\frac{A_{ref}}{A_{app}}\Phi\right)\right), \overline{\sigma}_e - \Delta_e 0.4\cdot\left(1-\ln\left(\frac{L_{ref}}{L_{app}}\Phi\right)\right)\right). \qquad (3)$$

As an example, a glass ribbon having a length of 100 m, a width of 0.2 m and a thickness of 50 μm is to be wound to a coil for intermediate storage and subsequent processing by cutting glass sheets from the ribbon and processing them by the edge pre-treatment and chemically toughening. The Young's modulus of the glass is E=74.8 GPa and the Poisson ratio amounts to ν=0.238. The maximum rate of breakage shall not exceed 1%, i.e. Φ=0.01.

As an example, the inner radius is chosen according to term (3). Break tests were performed with samples having a surface area of $A_{Ref}$=121 $mm^2$. The relevant edge length for the two-point bending test employed in this example amounts to $L_{Ref}$=2 mm. The break tests yielded $\overline{\sigma}_a$=421 MPa (median) and $\Delta_a$=35 MPa (standard deviation) as parameters for the surface strength; $\overline{\sigma}_e$=171 MPa (median) and $\Delta_e$=16.9 MPa (standard deviation) as parameters for the edge strength.

Using $A_{app}$=0.2 m×100 m=20 $m^2$ and $L_{app}$=2 ×200 m=200 m in Term (3) yields:

$$\overline{\sigma}_a - \Delta_a 0.4\times\left(1-\ln\left(\frac{A_{ref}}{A_{app}}\Phi\right)\right) = \left(421 - 35\times 0.4\times\left(1-\ln\left(\frac{121\times 10^{-6}\ \mathrm{m}^2}{20\ \mathrm{m}^2}\times 0.01\right)\right)\right)\mathrm{MPa} = 175\ \mathrm{MPa} \qquad (4)$$

$$\overline{\sigma}_e - \Delta_e 0.4\times\left(1-\ln\left(\frac{L_{ref}}{L_{app}}\Phi\right)\right) = \left(171 - 16.9\times\left(1-\ln\left(\frac{2\cdot 10^{-3}\ \mathrm{mm}}{200\ \mathrm{m}}\cdot 0.01\right)\right)\right)\mathrm{MPa} = 55\ \mathrm{MPa}\ \times \qquad (5)$$

Accordingly, the strength of the edges (eq. 4) is lower than the surface strength (eq. 5) and therefore is decisive for the lifetime of the glass coil.

According to term (3) the maximum tensile force is:
0.93·Min(175 MPa,55 MPa)=0.93·55 MPa=51 MPa
Inserting $$\frac{E}{1-\nu^2} = 79.3\cdot 10^3\ \mathrm{MPa}$$

and t=0.05 mm in equation (2) yields the minimum radius at the inner side of the coil:

$$R \geq \frac{1}{2}\frac{79300\ \mathrm{MPa}}{51\ \mathrm{MPa}}0.05\ \mathrm{mm} = 39\ \mathrm{mm}$$

Accordingly, the inner coil diameter should at least be 2×39 mm=78 mm. To meet this condition, e.g. the ribbon may be wound up to a coil with an inner diameter of 80 mm. This diameter also results in a tensile force exceeding 22 MPa so that both a compact size of the coil and a low probability of long-term breakage are achieved.

As is evident from the example, the edge strength not only influences the yield of the chemical toughening but also the overall yield if a large sized glass sheet such as a glass ribbon is used as a base material. Thus, the overall yield of the whole process using glass ribbon as a starting material can be further improved if the edges of the ribbon are treated. According to a further refinement of the invention, therefore, it is contemplated that the edges of the ribbon are etched to improve the surface quality and therefore the long term stability of the ribbon. Specifically, the method according to the invention may further comprise the step of etching the longitudinal edges of the glass ribbon, preferably prior to coiling the same up for forming the coil.

The invention also provides for an ultrathin glass sheet for the use as a semi-finished product in the method as described herein, with a first surface and a second surface joined by at least one edge, having a thickness (t) between the first and the second surface, with reduced and/or blunted edge defects on the at least one edge, preferably all edges, in order to increase resistance to breakage of the ultrathin glass sheet during a later chemical toughening. Such a semi-finished product is ready to undergo a chemical toughening treatment as described herein, ensuring a high yield as described in the above. The average surface roughness of the at least one edge advantageously is less than 10 μm, preferably less than 5 μm, more preferably less than 2 μm, even more preferably less than 1 μm and most preferably less than 0.5 μm. The thickness (t) of the semi-finished product is preferably equal to or less than 0.4 mm, preferentially equal to or less than 0.3 mm, more preferably equal to or less than 0.2 mm and most preferably equal to or less than 0.1 mm. Further features and advantages of the semi-finished product can be gathered from the description of the method according to the invention herein.

The invention also provides for an ultrathin chemically toughened glass article, preferably produced by the method as described herein, with a first surface and a second surface joined by at least one edge, having a thickness (t) between the first and the second surface with reduced and/or blunted glass defects on the at least one edge, preferably on all edges. The thickness (t) of the article is preferably equal to or less than 0.4 mm, preferentially equal to or less than 0.3 mm, more preferably equal to or less than 0.2 mm and most preferably equal to or less than 0.1 mm. The average surface roughness of the edge(s) of the ultrathin chemically toughened glass article thereby advantageously is less than 10 μm, preferably less than 5 μm, more preferably less than 2 μm, even more preferably less than 1 μm and most preferably less than 0.5 μm.

Preferably, the glass defects of the ultrathin chemically toughened glass article, preferentially produced by applying the post-treatment as described herein, are reduced and/or blunted in at least an area of at least one of the surfaces, preferably such that the average surface roughness in the at least one area is less than 10 μm, preferably less than 5 μm, more preferably less than 2 μm, even more preferably less than 1 μm and most preferably less than 0.5 μm. In a preferred embodiment, the edges and/or the surface areas with reduced and/or blunted defects are etched with an acidic solution, in particular with one or more of HF, $H_2SO_4$, HCl, $NH_4HF_2$ in aqueous solution. In another preferred embodiment, the ultrathin chemically toughened glass article has an essentially rectangular shape, preferably with rounded corners with a corner radius (A) of equal or less than 20 mm, preferably equal or less than 10 mm, more preferably equal or less than 8 mm, most preferably equal or less than 6 mm, and preferably has at least one hole, preferably with a circular or essentially rectangular shape with rounded corners. Advantageously, the edge(s) bordering the rounded corners and/or, if applicable, the edge(s) bordering the at least one hole have reduced and/or blunted glass defects like the at least one edge.

In a further preferred embodiment, the ultrathin chemically toughened glass article has a surface compressive stress layer due to an ion-exchanged layer, where a depth of an ion-exchange layer DoL ($L_{DoL}$) is less than 30 μm, a surface compressive stress CS ($\sigma_{CS}$) is between 100 MPa and 700 MPa, and a central tensile stress CT ($\sigma_{CT}$) is less than 120 MPa, wherein the thickness t, DoL, CS and CT of the toughened ultrathin glass article meets the relationship $$\frac{0.2t}{L_{DoL}} \leq \frac{\sigma_{CS}}{\sigma_{CT}}.$$

The ultrathin chemically toughened glass article according to the invention can have a bending radius of 150 mm or less, preferably 100 mm or less, more preferably 50 mm or less, even more preferably 30 mm or less and most preferably 15 mm or less. The ultrathin chemically toughened glass article can have a flexural strength of 200 MPa or more, preferably 500 MPa or more, more preferably 1000 MPa or more and most preferably 1500 MPa or more. The flexural strength is thereby being measured by a three point bending test.

According to one embodiment of the invention, chemical toughening may be carried out in a roll-to-roll process. Specifically, the method may comprise the steps of providing a glass ribbon wound to a glass coil, continuously decoiling the glass coil, while decoiling, chemically toughening the glass ribbon in a section decoiled from the glass coil, and recoiling the chemically toughened glass ribbon to provide a glass coil.

Accordingly, the method comprises a continuous treatment of the glass ribbon. In the intermediate section between the glass coils, the edge treatment according to the invention may be performed in addition to the chemical toughening. This way, chemical toughening and edge treatment are carried out during a single roll-to-roll process.

To realize the on-line roll-to-roll toughening of ultrathin glasses, it is useful to consider several parameters, such as the pre-heating temperature and the temperature gradient distribution, toughening temperature and time, feeding speed of the glass ribbon, post-heating temperature and the temperature gradient distribution. According to a refinement of the invention, the glass ribbon first enters a pre-heating temperature section to avoid breakage under sudden heat shock if entering into the toughening furnace directly. The pre-heating furnace can be designed to provide a gradient temperature distribution from room temperature to the toughening temperature. The glass ribbon enters from the cooler side, the temperature of which is set preferably from room temperature to 150° C. The output side of the pre-heating furnace is close to the toughening furnace, and the temperature of the output side is around the toughening temperature (350° C. to 550° C.). Since the toughening time also depends on the required CS and DoL, the feeding speed of the glass ribbon into the furnace can be calculated by the length of the ribbon section immersing in the salt bath divided by the toughening time. A post-heating furnace for cooling down the toughened ultrathin glasses may be provided. This furnace may be of similar design as the pre-heating furnace.

According to one embodiment, the glass ribbon is immersed and moved through a melted salt bath containing potassium ions so as to perform the chemical toughening.

According to a further embodiment, the chemical toughening comprises the steps of spraying an aqueous potassium salt solution onto the glass sheet, in particular a glass ribbon, heating the glass sheet to evaporate the water of the aqueous solution so as to leave the potassium salt on the glass surface, and subsequently moving the glass sheet through a toughening furnace, the furnace further heating the glass so that an ion exchange for the chemical toughening is promoted. The heating to evaporate the water may be accomplished in a pre-heating furnace which also heats the glass up to the temperature for the subsequent chemical toughening. Suitable potassium containing salts for the aqueous solution are particularly $KNO_3$, $K_3PO_4$, KCl, KOH, $K_2CO_3$.

The pre-heating furnace preferably has a temperature gradient. The feeding speed of the ultrathin glass into the furnace may be calculated by the length of the toughening furnace divided by the toughening time. Again, a post-heating treatment for controlled cooling down of the toughened glass ribbon may be performed.

This embodiment of chemical toughening involving drying of an aqueous solution to produce a potassium containing salt film on the glass surface is not restricted to a roll-to roll-process. Thus, the chemical toughening may be applied to the glass ribbon after hot forming, e.g. subsequent to a down-drawing or redrawing step.

According to a possible refinement, the pre-heating and cooling may be performed in the same furnace. To do so, for example, the glass ribbon may be guided in a loop so that the direction of movement is reversed. This way, the chemically toughened glass and the ribbon sections yet to be heated up and toughened are moving in opposite directions within the furnace.

Further features and advantages of the ultrathin chemically toughened glass article can be gathered from the description of the method according to the invention herein.

BRIEF DESCRIPTION OF THE DRAWINGS

The figures used for illustration of the invention show:

FIG. 3*a*: schematic cut view of the edge of an as-cut glass sheet;

FIG. 3*b*: schematic cut view of an etched glass sheet prior to chemical toughening;

FIG. 4: shape and dimensions of an ultrathin glass article according to the invention as used as glass samples in examples 1 to 4;

DETAILED DESCRIPTION

Figure 1:
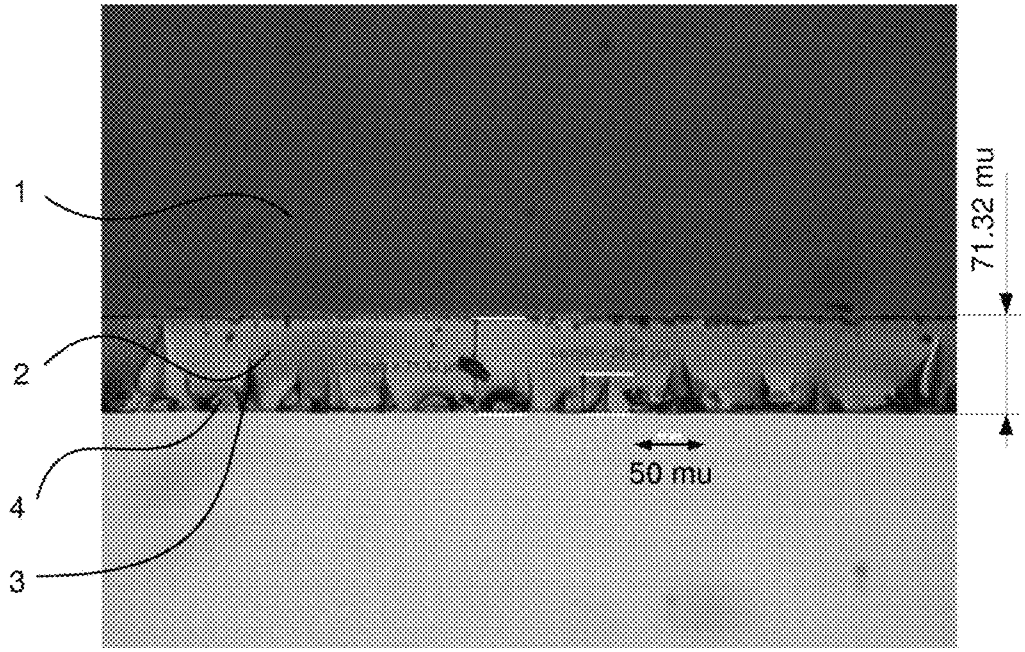
FIG. 1: edge quality of an exemplary as-cut ultrathin glass.

FIG. 1 shows an image of the edge quality of an ultrathin glass sheet 1 as-cut i.e. without further treatment of an edge 2 after cutting. The edge clearly shows numerous sharp cracks 3 and chippings 4 as a direct result from the cutting of the glass e.g. after scribing and breaking by diamond wheel or diamond tip.

Figure 2:
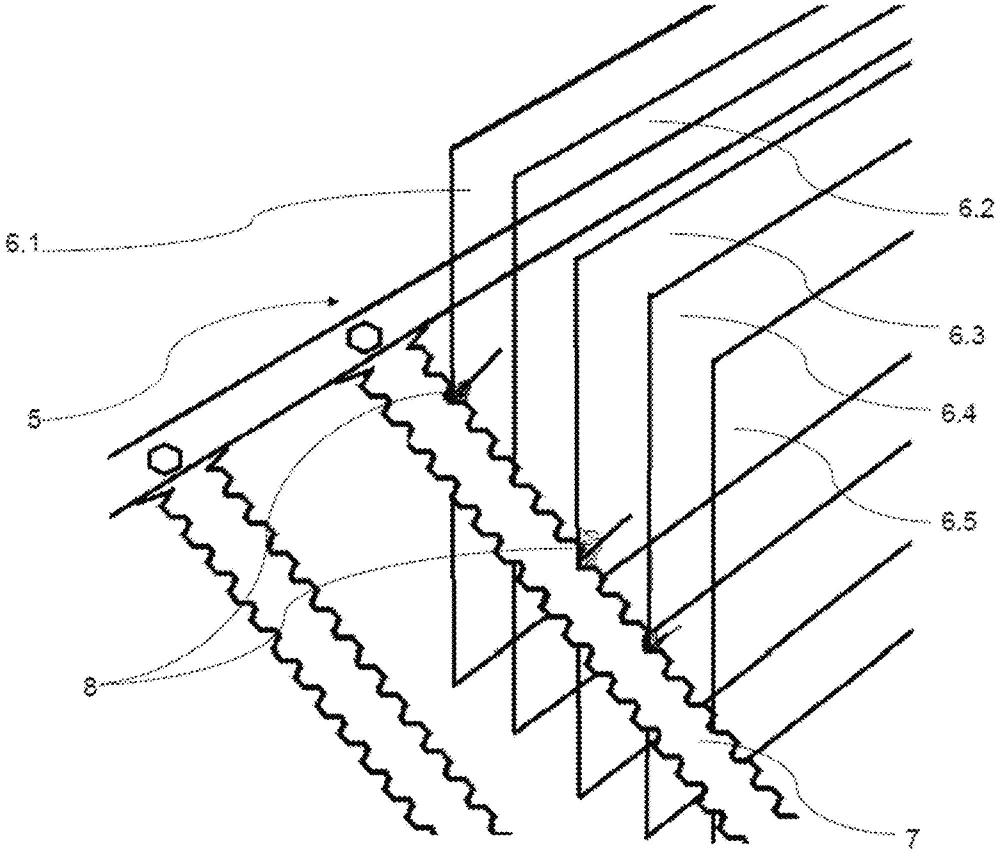
FIG. 2: clamping-force induced cracks in toughened 0.1 mm glass sheets.

FIG. 2 shows a toughening holder 5 with several glass sheets 6.1 to 6.5 held in it. During toughening, the glass sheets 6.1 to 6.5 are placed vertically on the toughening holder 5. The two cutting edges of the vertical arranged glass sheets 6.1 to 6.5 are clamped by two zigzag steel sticks 7. After loading the ultrathin glass on the sample holder 5 into the melted salt bath, which is typically above 400° C., the different thermal expansion coefficients of steel stick 7 and glass sheets 6.1 to 6.5 induce a clamping force. Under the force, the cracks and chippings may propagate and induce the breakage 8 of the ultrathin glasses during toughening as can be seen in several of the glass sheets 6.2 and 6.4 of FIG. 2. The toughening yield for thin and ultrathin glass sheets 6.1 to 6.5 is therefore generally rather poor.

FIG. 3*a* and FIG. 3*b* show schematic cut-views of edges 10 of ultrathin glass sheets as-cut (FIG. 3*a*) and after an edge pre-treatment including edge etching according to the invention (FIG. 3*b*). The sharp flaws 11 of as-cut ultrathin glasses are blunted 12 by etching as shown in FIG. 3*b*. The stress in the glass thus is decreased significantly which benefits the toughening yield for ultrathin glasses. This method has proven to be surprisingly efficient for glasses with holes or rounded corners. Considering the stress related to the size of the defects and the curvature of the defects, however, there is a balance of etching: since the etching blunts the flaws on the one hand, it also increases the size of defects to some extent on the other hand. To specific optimal amount of etching can depend on a variety of parameters and is to be determined e.g. dependent on the glass type, thickness of the glass, etching solution etc.

FIG. 4 shows a schematic view of the shape of an exemplary ultrathin glass sheet or ultrathin chemically toughened glass article 15 according to the invention as it is used as samples in the examples 1 to 4. The glass article 15 has an essentially rectangular form with a width B, a length L and rounded corners with a Radius A. The glass article 15 has a circular hole 16 at one of its corners centered at a distance D from the neighboring edges 17. In the examples 1 to 4 below, D=10 mm and a=5 mm whereas A=10 mm. The ratio of L and B of the glass article 15 as displayed in FIG. 4 does not correspond to the values given in the examples 1 to 4 and rather serves for the illustration of the basic shape.

Figure 5:
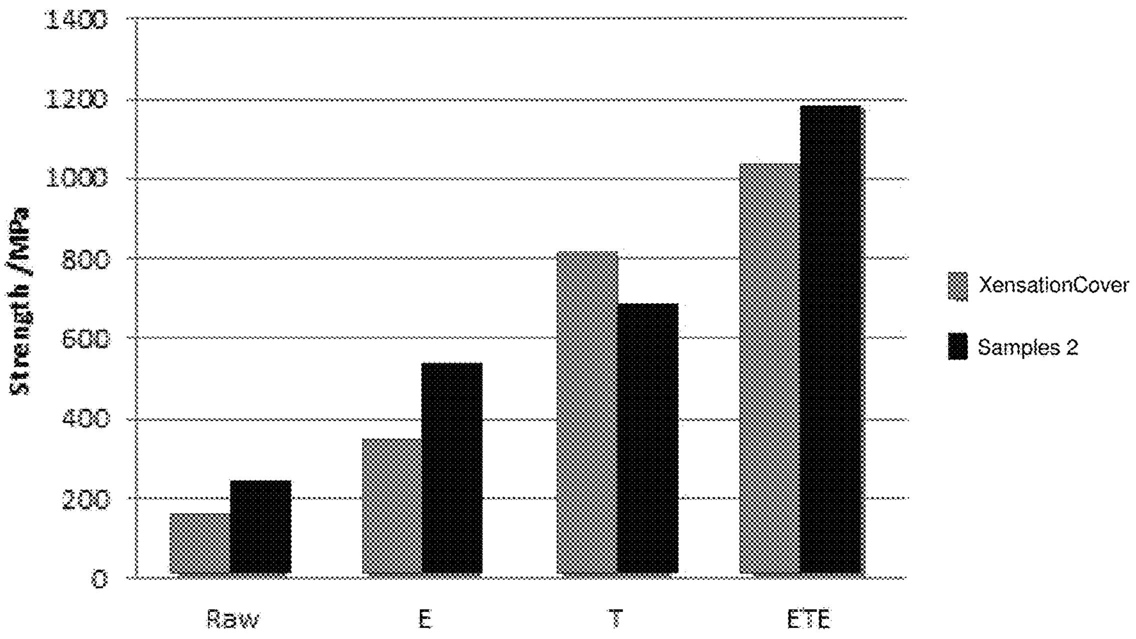
FIG. 5: comparison of strengths of two different glass types XensationCover® and glass samples according to example 2 that were treated in four different ways.

FIG. 5 shows comparative values for the strength of two different glass types D263® and AS87 by SCHOTT® which have been treated in four different ways according to the below described example 2. The corresponding strengths for as-cut (Raw), only pre-etched (E), only toughened (T) and (pre)etched-toughened-(post)etched samples for both glass types are shown. FIG. 5 is further described in context with example 2.

Figure 6A:
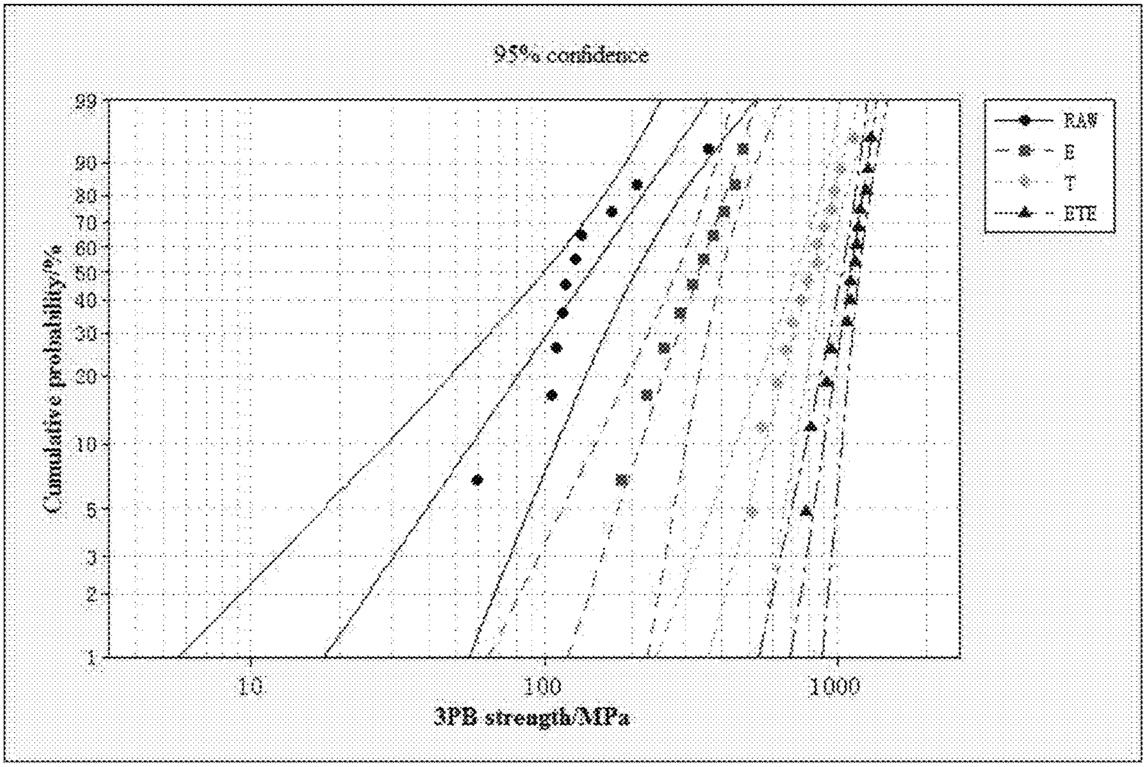
FIG. 6*a*: cumulative probability for the three point bending strength of the two different glass types XensationCover®
Figure 6B:
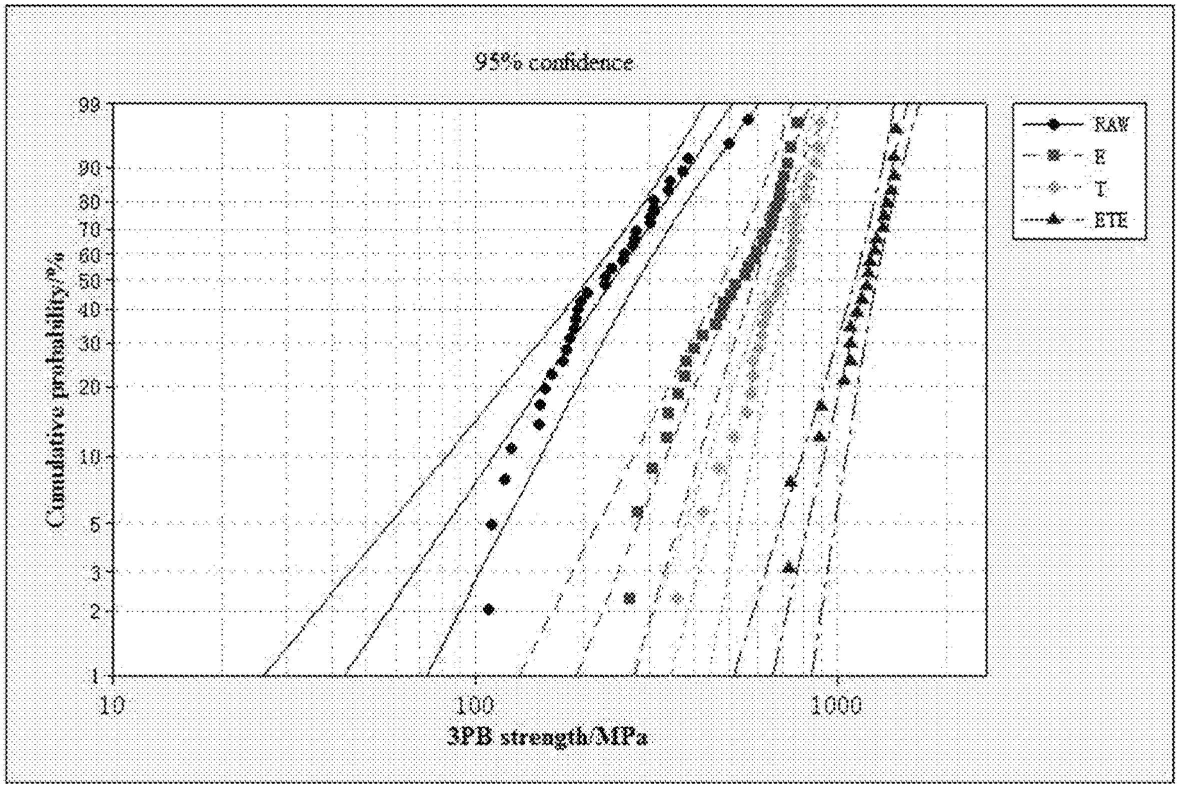
FIG. 6*b*: cumulative probability for the three point bending strength of the glass samples according to example 2.

FIG. 6*a* and FIG. 6*b* show double logarithmic plots for the cumulative probability in % for a resulting strength of the glass samples according to example 2 for the four different treatments as described in context with FIG. 5. FIGS. 6*a* and 6*b* are further described in context with example 2.

Figure 7:
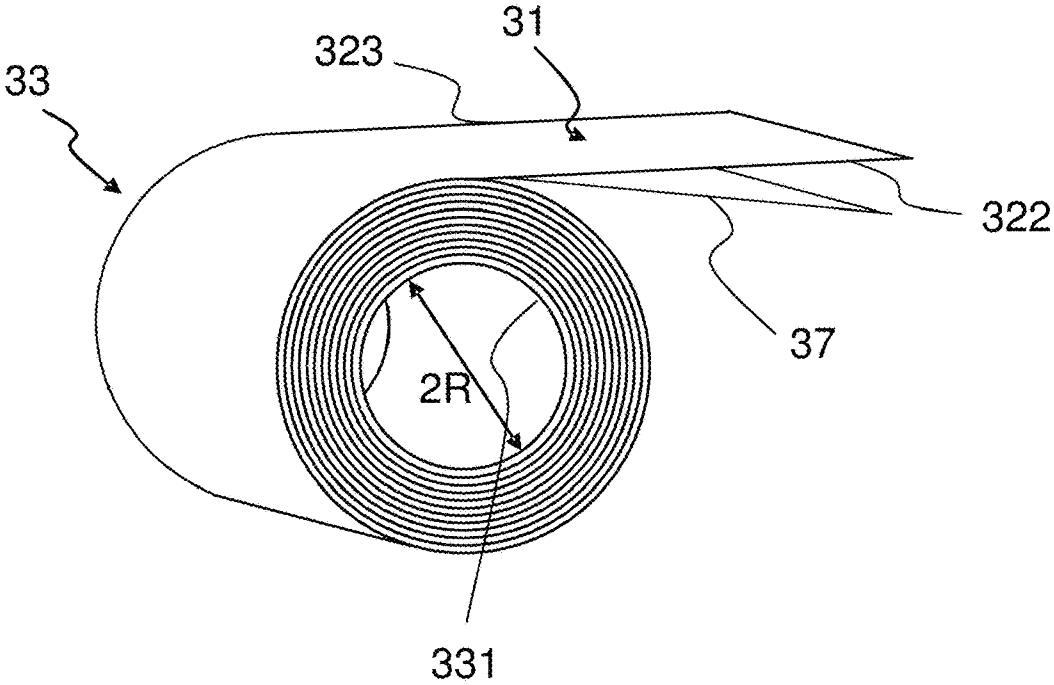
FIG. 7: schematic view of a glass ribbon coiled up to form a coil.

FIG. 7 shows an example of a coil 33 as described above. A glass ribbon 31 is coiled up to form coil 33 having the shape of a hollow cylinder. The longitudinal edges 322, 323 of the glass ribbon 1 form the abutting faces of coil 33. In the embodiment as shown, the inner face 331 of the coil is exposed. In difference to the embodiment of FIG. 7, the glass ribbon 1 may also be wound about a shaft so that the inner face 331 is in contact to the outer shaft surface.

To protect the surfaces of the glass ribbon 31, a sheet material 37 may be wrapped in. This sheet material 37 radially separates the layers of the glass ribbon 33. A paper ribbon or a plastic foil may suitably be used as sheet material 37.

Figure 8:
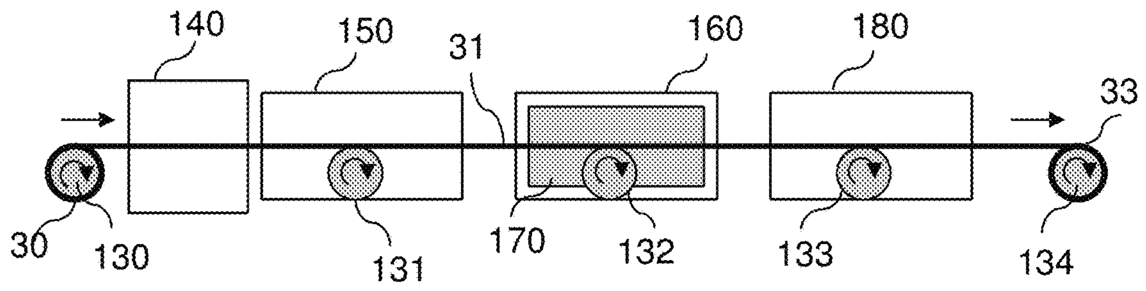
FIG. 8: a schematic view of an embodiment of a roll-to-roll process.

FIG. 8 shows a schematic of a device for carrying out the method according to the invention. According to this embodiment, the glass ribbon 31 is treated in a roll-to-roll process. Thus, processing is based on the method steps of providing a glass ribbon 31 wound to a coil 30; continuously decoiling coil 30; while decoiling, chemically toughening the glass ribbon 31 in a section decoiled from coil 30; coiling up the chemically toughened glass ribbon 31 to provide a further coil 33.

The device comprises rolls 130, 131, 132, 133, 134 to transport the glass ribbon 31. Arrows indicate the direction of movement. The rotational speed of rolls 130 to 134 determines the feeding speed of the glass ribbon 31. However, not all of the rolls need to be powered. For example, roll 134 may be powered to move the glass ribbon. The other rolls 130-133 are guiding and supporting the glass ribbon 31 and are rotated by means of the moving ribbon.

The uncoiled sections of the glass ribbon first pass through a pre-treatment unit 140. In this unit 140, the edge pre-treatment according to the invention is carried out. Optionally, further steps such as cleaning of the glass surface may be performed.

Thereafter, the glass ribbon 31 traverses a pre-heating furnace 150 which gradually heats up the glass to the temperature for the subsequent chemical toughening. Pre heating avoids or minimizes mechanical strains due to temperature differences in the glass. The pre-heating furnace 150 may be designed to provide a temperature gradient along the movement path to attain a slow, uniform and continuous heating.

A pre-heating furnace 150 or a heating step prior to chemical toughening, respectively, including heating the glass article up from a starting temperature to a temperature suitable for subsequent chemical toughening is not restricted to a particular embodiment with a roll-to-roll treatment. Generally, pre-heating may also be used in a batch processing of separate glass sheets or in an inline chemical toughening treatment after hot-forming the ribbon. Typically, the glass article is heated up to a temperature between 300° C. to 550° C.

After pre-heating, the glass ribbon traverses a chemical toughening unit 160. Within this unit, the ribbon 31 is immersed into a molten salt bath 170. The salt bath contains potassium ions which are exchanged with sodium or lithium ions.

The advance speed of the glass ribbon is set so that the desired time for toughening within the salt bath 170 is met. The time for toughening depends on the temperature of the salt bath 170 as well as on the DoL to be achieved. For example, a DoL in the range of 3-5 μm may be readily obtained with a toughening time of 10-15 minutes.

After the toughening, the glass ribbon 31 preferably undergoes a post-treatment in a post-treatment unit 180. The post-treatment unit 180 may in particular include a lehr or cooling furnace, respectively. Due to the slow cooling down of the ribbon within the lehr, mechanical strains are removed. As for the pre-heating furnace 150, the lehr may have a temperature gradient, however, in this case with the highest temperature at its entrance and the lowest temperature at its exit. Preferably, the glass ribbon 31 is cooled down to a temperature of less than 150° C. prior to recoiling the ribbon to a further roll 33.

Figure 9:
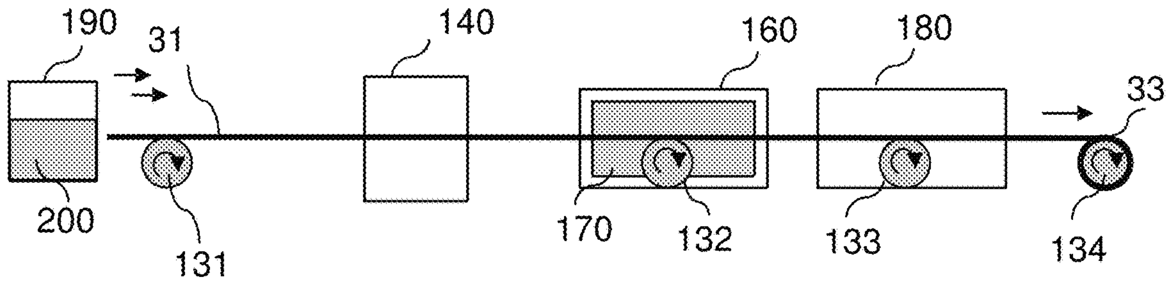
FIG. 9: a schematic view of a device for continuous production of a glass ribbon.

FIG. 9 shows a variant of the embodiment as described above. This variant differs from the embodiment of FIG. 8 in that the edge treatment and chemical toughening according to the invention are incorporated into the hot forming process of the glass ribbon. According to this embodiment, generally, the glass ribbon 31 is formed in a hot forming device 190 and spooled to form a coil 33. The edge treatment, in particular an etching and the chemical toughening are carried out between the hot forming and spooling steps. Accordingly, the pre-treatment unit 140 and the chemical toughening unit 160 are positioned between hot forming unit 190 and roll 134 which spools the ribbon to form coil 33.

Any suitable hot forming process may be employed. In the embodiment as shown, the glass ribbon is formed from a melt 200, e.g. by down-drawing or overflow fusion. However, the ribbon may also be formed from a heated preform by redrawing.

Figure 10:
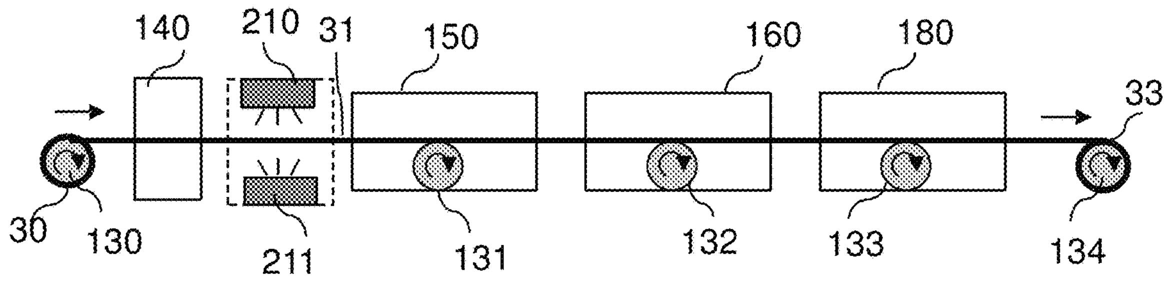
FIG. 10: an embodiment with deposition of aqueous potassium salt solution onto the glass ribbon prior to chemical toughening.

FIG. 10 shows another variant of the embodiment of FIG. 8. This variant is independent on how the ultrathin glass sheet is provided. As exemplary shown, a roll-to-roll processing similar to FIG. 8 may be employed. However, this embodiment may also be integrated as an inline processing within a hot forming process of a glass ribbon. Further, a batch processing of separate ultrathin glass sheets is possible as well.

After being edge-treated within pre-treatment unit 140, the decoiled sections of ribbon 31 pass through a spraying unit 210. Within this unit, an aqueous solution of at least one potassium salt is sprayed onto the surface of the glass ribbon 31. Within pre-heating furnace 150 the glass ribbon 31 is heated. Thereby, water from the aqueous solution is evaporated, leaving a salt film on both opposite surfaces of the ribbon 31. The glass then passes through the furnace 160 for chemical toughening. Therein, the salt melts and the ion exchange for the chemical toughening is promoted. The glass then passes through a post treatment unit 180 in which the glass is treated as described above. The post treatment may include a cleaning step to remove the salt from the glass surface. Finally, the ribbon 31 is spooled to form a further coil 33.

Differently from the exemplary embodiment of FIG. 10, pre-heating and/or cooling down after the ion exchange may be carried out in the same furnace used for the chemical toughening.

Figure 11:
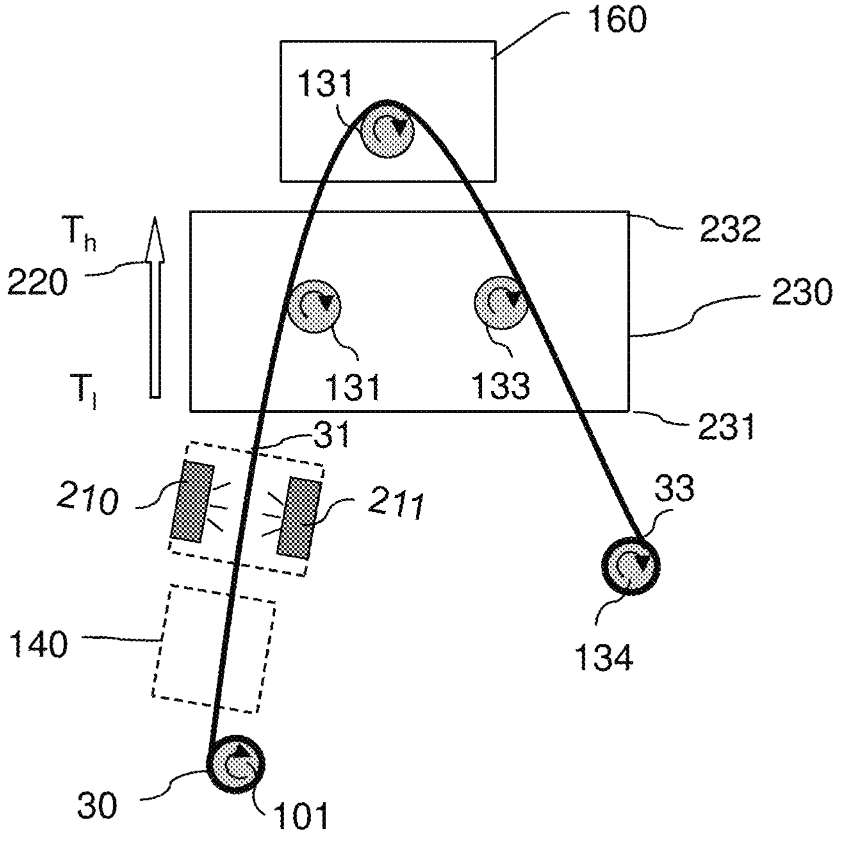
FIG. 11: an embodiment where the glass ribbon is heated up prior to chemical toughening and cooled down after chemical toughening in a single furnace.

FIG. 11 shows an embodiment with a continuous furnace 230 that serves both as a pre-heating furnace and a lehr or cooling furnace. For this purpose ribbon 31 passes through the furnace 230 twice and in reversed directions. The ribbon 31 may be bend over a roll 131 to deflect its direction of movement.

The furnace 230 may be set up to provide a temperature gradient 220 ranging from a temperature $T_l$ at furnace opening 231 to a higher temperature $T_h$ at opening 232. The ribbon 31 passes a first time and thereby is gradually heated up from temperature $T_l$ to temperature $T_h$ and then enters the furnace 160 for chemical toughening. Temperature $T_h$ may be equal to or close to the temperature within furnace 160. The ribbon 31 is deflected and is again guided through the furnace 230. This time, however, the ribbon traverses the temperature gradient in reverse direction and therefore is gradually cooled down.

Without loss of generality, alkali containing glasses are employed for the following examples. It is immediately clear that any other ion-exchangeable glasses as e.g. silicate or borosilicate glasses or other glasses that can be chemically toughened by other means will also benefit from the present invention. Alkali containing glasses as e.g. according to PCT/CN2013/072695 by SCHOTT® are particularly suitable.

The following tables give an overview over the compositions (Table 1) and selected properties (Table 2) of examples 1 to 4 as described in the following.

TABLE 1

Exemplary embodiments of alkali-contained borosilicate glass

| Composition (wt. %) | Example 1 | Example 2 | Example 3 | Example 4 |
|---|---|---|---|---|
| $SiO_2$ | 80 | 64 | 70 | 61 |
| $Al_2O_3$ | 3 | 7 | 1 | 18 |
| LiO | — | — | — | 5 |
| $Na_2O$ | 5 | 6 | 8 | 10 |
| $K_2O$ | — | 6 | 8 | 1 |
| CaO | — | — | 7 | 1 |
| BaO | — | — | 2.5 | — |
| $ZnO_2$ | — | 5 | 2.4 | — |
| $ZrO_2$ | — | — | — | 3 |

TABLE 1-continued

Exemplary embodiments of alkali-contained borosilicate glass

| Composition (wt. %) | Example 1 | Example 2 | Example 3 | Example 4 |
|---|---|---|---|---|
| $B_2O_3$ | 12 | 8 | 0.1 | 1 |
| $TiO_2$ | — | 4 | 1 | — |

TABLE 2

Property of the exemplary embodiments

| Property | Example 1 | Example 2 | Example 3 | Example 4 |
|---|---|---|---|---|
| E | 64 GPa | 73 GPa | 72 GPa | 83 GPa |
| Tg | 525° C. | 557° C. | 533° C. | 505° C. |
| CTE | $3.3 \times 10^{-6}$/K | $7.2 \times 10^{-6}$/K | $9.4 \times 10^{-6}$/K | $8.5 \times 10^{-6}$/K |
| Annealing point | 560° C. | 557° C. | 541° C. | 515° C. |
| Density | 2.2 g/cm$^3$ | 2.5 g/cm$^3$ | 2.5 g/cm$^3$ | 2.5 g/cm$^3$ |
| λ | 1.2 W/mK | 0.9 W/mK | 1 W/mK | 1 W/mK |
| σ1 * | 86 MPa | 143 MPa | 220 MPa | 207 MPa |
| μ | 0.2 | 0.2 | 0.2 | 0.2 |
| R | 391 W/m | 196 W/m | 260 W/m | 235 W/m |
| ΔT | 652° C. | 435° C. | 520° C. | 469° C. |
| ε | 29.1 GPa*cm3/g | 29.2 GPa*cm3/g | 28.8 GPa*cm3/g | 33.2 GPa*cm3/g |

Example 1

Glass with a composition according to example 1 in Tables 1/2 is produced by a down-draw method and cut into 440 mm×360 mm×0.1 mm glass sheets. These sheets were then cut with a 100° Penett diamond cutting wheel with 360#teeth. 40 samples with dimensions 50 mm×50 mm (see FIG. 4, L=50 mm, B=50 mm), 142 mm×75 mm (see FIG. 4, L=142 mm, B=75 mm), and 300 mm×200 mm (see FIG. 4, L=300 mm, B=200 mm) were cut. The samples were provided by means of a $CO_2$ laser with one circular hole (16, FIG. 4) with a radius of a=5 mm and four rounded corners with radius A=10 mm as shown in FIG. 4. The samples were also provided with four R5 corners (the radius of the corner is 5 mm) as shown in FIG. 4. In addition, 60 pieces 20 mm×50 mm×0.1 mm were cut. The edges of half of the amount of the as-cut samples were etched by $NH_4HF_2$ solution (edge pre-treatment). The etching amount was around 1 μm. All samples were chemically toughened in 100% $KNO_3$ for 15 hours at 430° C. The pre-etched and toughened samples were also post-etched after toughening (post-treatment). The remaining 30 samples were only chemically toughened without any pre- or post-treatment as reference samples. After the ion-exchange, the toughened samples were cleaned and measured with FSM 6000. The result is an average CS of 122 MPa and the DoL is 13.2 μm. The toughening yield of the reference samples with holes and rounded corners is very low. However, surprisingly, the toughening yield of the pre-etched samples is significantly increased. The details of the increase in yield are displayed in Table 3 (a) and (b) where the reference samples are compared with the pre-etched samples. The additional post-etching increases the strength by removing or blunting flaws or micro cracks that are induced by the chemical toughening. After post-etching, the CS is 97 MPa and the DoL is 11.8 μm.

TABLE 3 (a)

| Toughening yield of example 1 with holes and rounded corners without pre-etching | | | | | | | |
|---|---|---|---|---|---|---|---|
| | Thickness (mm) | | | | | | |
| Size | | 0.05 | 0.07 | 0.1 | 0.21 | 0.3 | 0.4 |
| 50 mm × 50 mm | <48.1% | <51.4% | <56.8% | <56.8% | >98.7% | >98.9% | >99.8% |
| 142 mm × 75 mm | <32.8% | <34.6% | <41.2% | <44.5% | >98.8% | >99.4% | >99.8% |
| 200 mm × 300 mm | <16.7% | <19.4% | <28.5% | <30.1% | >99.5% | >99.4% | >99.8% |

TABLE 3 (b)

| Toughening yield of example 1 with holes and rounded corners with pre-etching | | | | | | | |
|---|---|---|---|---|---|---|---|
| | Thickness (mm) | | | | | | |
| Size | 0.03 | 0.05 | 0.07 | 0.1 | 0.21 | 0.3 | 0.4 |
| 50 mm × 50 mm | >86.7% | >89.2% | >92.0% | >95.7% | >99.0% | >99.7% | >99.8% |
| 142 mm × 75 mm | >83.3% | >84.8% | >86.7% | >86.7% | >98.9% | >99.5% | >99.8% |
| 200 mm × 300 mm | >74.3% | >75.8% | >85.8% | >86.4% | >99.5% | >99.5% | >99.8% |

A three point bending test has been performed in a universal mechanical test machine for the 20 mm×50 mm samples. The result showed that the toughened glass of the reference samples has a flexural strength of 147 MPa and a bending radius of 45 mm without breakage. The strength of the toughened samples with pre- and post-etching is around 200 MPa and the bending radius is near 30 mm. The flexibility is remarkably enhanced by the pre- and post-treatment according to the invention.

Example 2

Glass with a composition according to example 2 in Tables 1/2 is produced by a down-draw method and cut into 440 mm×360 mm×0.1 mm glass sheets. The glass sheets were then cut with a 100° Penett diamond cutting wheel with 360#teeth. 40 samples with dimensions 50 mm×50 mm (see FIG. 4, L=50 mm, B=50 mm), 142 mm×75 mm (see FIG. 4, L=142 mm, B=75 mm), and 300 mm×200 mm (see FIG. 4, L=300 mm, B=200 mm) were cut. The samples were provided with one circular hole (16, FIG. 4) with a radius of a=5 mm and four rounded corners with radius A=10 mm as shown in FIG. 4.

In addition, 90 pieces 20 mm×50 mm×0.1 mm were cut. The edges of 60 pieces of the as-cut samples were etched by $NH_4HF_2$ solution for 5 min (edge pre-treatment). The etching amount is around 1 μm. Then 30 samples were chemically toughened in 100% $KNO_3$ for 3 hours at 400° C. The pre-etched and toughened samples were also post-etched after toughening (post-treatment). 30 samples were only chemically toughened without any pre- or post-treatment as reference samples.

After the ion-exchange, the toughened samples were cleaned and measured with FSM 6000. The result is an average CS is 304 MPa and the DoL is 14.0 μm. The toughening yield of the reference samples with holes and rounded corners is very low. However, surprisingly, the toughening yield of the pre-etched samples is significantly increased. The details of the increase in yield are displayed in Tables 4 (a) and (b) where the reference samples are compared with the pre-etched samples. The additional post-etching increases the strength by removing or blunting flaws and/or micro cracks that are induced by the chemical toughening. After post-etching, the CS is 280 MPa and the DoL is 13.4 μm.

TABLE 4 (a)

| Toughening yield of example 2 with holes and rounded corners without pre-etching | | | | | | | |
|---|---|---|---|---|---|---|---|
| | Thickness (mm) | | | | | | |
| Size | 0.03 | 0.05 | 0.07 | 0.1 | 0.21 | 0.3 | 0.4 |
| 50 mm × 50 mm | <47.1% | <53.2% | <55.7% | <58.2% | >98.7% | >99.1% | >99.8% |
| 142 mm × 75 mm | <19.8% | <33.6% | <43.7% | <46.2% | >98.8% | >98.9% | >99.8% |
| 200 mm × 300 mm | <16.7% | <21.4% | <27.5% | <33.1% | >99.5% | >99.5% | >99.8% |

TABLE 4 (b)

Toughening yield of example 2 with holes and rounded corners with pre-etching

| | Thickness (mm) | | | | | | |
|---|---|---|---|---|---|---|---|
| Size | 0.03 | 0.05 | 0.07 | 0.1 | 0.21 | >0.3 | 0.4 |
| 50 mm × 50 mm | >87.2% | >89.7% | >93.1% | >95.8% | >99.2% | >99.2% | >99.8% |
| 142 mm × 75 mm | >84.3% | >84.8% | >87.2% | >88.7% | >98.9% | >99.0% | >99.8% |
| 200 mm × 300 mm | >77.3% | >80.8% | >86.3% | >87.5% | >98.5% | >99.0% | >99.8% |

A three point bending test has been performed in a universal mechanical test machine for the pre-etched, toughened, and (pre)etched-toughened-(post)etched samples (30 pieces each). The following table shows the resulting average bending strengths for differently treated samples:

TABLE 5 (a)

Strength comparison of differently treated samples of example 2

| Samples | Strength |
|---|---|
| as-cut (RAW) | ~177 MPa |
| (pre)etched (E) | ~529 MPa |
| toughened (T) | ~680 MPa |
| (pre)etched, toughened, (post)etched (ETE) | ~1520 MPa |

The toughened glass of the reference samples with the flexural strength of 680 MPa has a bending radius of 30 mm without breakage. The toughened samples with pre- and post-etching with a strength of 1520 MPa have a bending radius of nearly 10 mm. The flexibility is thus remarkably enhanced by the pre- and post-treatment according to the invention.

Commercial aluminosilicate glass samples made from SCHOTT® Xensation Cover® were also prepared for comparison. The raw glass is 0.55 mm thick and cut by a 100° Penett diamond cutting wheel with 360#teeth into 10 mm×10 mm×0.55 mm and then polished to the thickness 0.1 mm. After that, the glass was chemically toughened at 390° C. for 1 hour. The resulting CS is around 808 MPa and the DoL is around 12.6 μm. As-cut samples, only toughened samples and pre-etched, toughened, post-etched samples were prepared for comparison. The additional post-etching with $NH_4HF_2$ for 5 min significantly increases the strength by removing or blunting flaws and micro cracks that are induced by the chemical toughening. After post-etching, the CS is 758 MPa and the DoL is 11.7 μm. The resulting average bending strengths for differently treated samples are as follows:

TABLE 5 (b)

Strength comparison of differently treated samples of XensationCover ®

| Samples XensationCover ® | Strength |
|---|---|
| as-cut (RAW) | ~150 MPa |
| (pre)etched (E) | ~312 MPa |
| toughened (T) | ~520 MPa |
| (pre)etched, toughened, (post)etched (ETE) | ~700 MPa |

FIG. 5, FIG. 6*a*, and FIG. 6*b* show several comparative values for the glass samples of example 2 and XensationCover® by SCHOTT®. As can be immediately seen from FIG. 5, the different glass types show a different increase in strength achieved by the method of (pre)etching-toughening-(post)etching (ETE). The method according to the invention is more effective on the glass of example 2 than on XensationCover®, but nevertheless shows a significant increase as compared to the as-cut (Raw), only (pre)etched (E) or only toughened (T) samples for both types of glasses.

As can be seen from FIG. 6*a* and FIG. 6*b*, the consistency of strength is also significantly enhanced for both glasses when comparing the cumulative probability for as-cut (RAW, solid with dots), only (pre)etched (E, long-dashed with squares), only toughened (T, short-dashed with diamonds) and (pre)etched-toughened-(post)etched (ETE, short-long dashed with triangles) samples.

It also becomes obvious from FIG. 5, FIG. 6*a*, and FIG. 6*b* that the only pre-etched samples have significantly higher strengths than the raw, as-cut samples which, ultimately, results in the high toughening yield according to the invention.

Example 3

Glass with a composition according to example 3 in Tables 1/2 is produced by a down-draw method and cut into 440 mm×360 mm×0.1 mm glass sheets. These sheets were then cut with a 100° Penett diamond cutting wheel with 360#teeth. 40 samples with dimensions 50 mm×50 mm (see FIG. 4, L=50 mm, B=50 mm), 142 mm×75 mm (see FIG. 4, L=142 mm, B=75 mm), and 200 mm×300 mm (see FIG. 4, L=300 mm, B=200 mm) were cut. The samples were provided with one circular hole (16, FIG. 4) with a radius of a=5 mm and four R5 corners (A=10 mm) as shown in FIG. 4. In addition, 60 pieces with dimensions 20 mm×50 mm×0.1 mm were cut. The edges of half of the amount of the as-cut samples were etched by $NH_4HF_2$ solution (edge pre-treatment). The etching amount is around 1 μm. All samples were chemical toughened in 100% $KNO_3$ for 2 hours at 420° C. The pre-etched samples were also post-etched after toughening (post-treatment). The remaining 30 samples were only chemically toughened without any edge pre- or post-treatment as reference samples. After the ion-exchange, the toughened samples were cleaned and measured with FSM 6000. The result is an average CS of 340 MPa and a Dol is 10.8 μm. The toughening yield of the reference samples with the holes and rounded corners is very low. However, surprisingly, the toughening yield of the pre-etched samples is significantly increased. The details of the yield increase are displayed in Table 5 (a) and (b) where the reference samples are compared with the pre- and post-etched samples. The additional post-etching increases the strength by removing or blunting flaws or micro cracks that are induced by the chemical toughening. After the post-etching, the CS is 319 MPa and the DoL is 9.6 μm.

TABLE 6 (a)

Toughening yield of example 3 with holes and rounded corners without pre-etching

| Size | Thickness (mm) 0.03 | 0.05 | 0.07 | 0.1 | 0.21 | 0.3 | 0.4 |
|---|---|---|---|---|---|---|---|
| 50 mm × 50 mm | <47.1% | <52.7% | <55.6% | <56.9% | >98.7% | >98.7% | >99.8% |
| 142 mm × 75 mm | <34.2% | <37.6% | <44.2% | <48.5% | >98.8% | >99.2% | >99.8% |
| 200 mm × 300 mm | <15.1% | <15.4% | <24.5% | <31.1% | >99.6% | >99.6% | >99.8% |

TABLE 6 (b)

Toughening yield of example 3 with holes and rounded corners with pre-etching

| Size | Thickness (mm) 0.03 | 0.05 | 0.07 | 0.1 | 0.21 | 0.3 | 0.4 |
|---|---|---|---|---|---|---|---|
| 50 mm × 50 mm | >88.5% | >89.8% | >93.4% | >96.4% | >99.2% | >99.2% | >99.8% |
| 142 mm × 75 mm | >85.4% | >87.2% | >88.4% | >93.8% | >98.9% | >99.0% | >99.8% |
| 200 mm × 300 mm | >79.4% | >83.6% | >87.0% | >89.8% | >98.5% | >99.0% | >99.8% |

A three point bending test had been performed in a universal mechanical test machine for the 20 mm×50 mm samples. The result showed that the toughened glass of the reference samples has a flexural strength of 473 MPa and a bending radius of 40 mm without breakage. The strength of toughened samples with pre- and post-etching is around 545 MPa, and the bending radius is around 35 mm.

Example 4

Glass with a composition according to example 4 in Tables 1/2 is 0.55 mm thick and cut by a 100° Penett diamond cutting wheel with 360#teeth into 60 samples with dimensions 10 mm×10 mm×0.55 mm. The pieces are then polished to a thickness of 0.1 mm. The edges of 30 pieces of the as-cut samples were etched by $NH_4HF_2$ solution. The etching amount is around 1 μm. All samples were chemically toughened in 100% $KNO_3$ for 4 hours at 420° C. The pre-etched and toughened samples were also post-etched after toughening (post-treatment). The remaining 30 samples were only chemically toughened without any edge pre- or post-treatment as reference samples. The resulting CS is around 814 MPa and the DoL is around 8.6 μm. The bending strengths are approx. 580 MPa for the reference samples and approx. 750 MPa for the pre-etched and post-etched toughened samples. The additional post-etching increases the strength by removing or blunting flaws and micro cracks that are induced by the chemical toughening. After post-etching, the CS is 456 MPa and the DoL is 7.1 μm.

What is claimed is:

1. A method for producing an ultrathin chemically toughened glass article, comprising:
providing an ultrathin glass sheet with a first surface and a second surface joined by at least one edge, the ultrathin glass sheet having a thickness between the first and the second surfaces;
chemically toughening the ultrathin glass sheet to produce an ultrathin chemically toughened glass article with a depth of an ion-exchange layer DoL ($L_{DoL}$) of less than 30 μm and a surface compressive stress CS ($\sigma_{CS}$) between 100 MPa and less than 600 MPa; and
applying an edge pre-treatment to the at least one edge of the ultrathin glass sheet prior to the chemical toughening step in order to reduce and/or blunt edge defects and to increase resistance to breakage of the ultrathin glass sheet during the chemical toughening.

2. The method according to claim 1, wherein the at least one edge comprises a plurality of edges and wherein the step of applying the edge pre-treatment comprises applying to all of the plurality of edges.

3. The method according to claim 1, further comprising applying an edge post-treatment to the at least one edge of the ultrathin chemically toughened glass article after the chemical toughening step in order to further reduce and/or blunt defects and to strengthen the toughened ultrathin glass article.

4. The method according to claim 3, wherein the at least one edge comprises a plurality of edges and wherein the step of applying the edge post-treatment comprises applying to all of the plurality of edges and to the first and the second surfaces.

5. The method according to claim 3, wherein the edge pre-treatment step is selected from the group consisting of a chemical treatment, a mechanical treatment, a temperature treatment, and any combinations thereof.

6. The method according to claim 1, wherein the edge pre-treatment step reduces a surface roughness to less than 10 μm.

7. The method according to claim 1, wherein the edge pre-treatment step removes an amount of material that is less than 25.0 μm.

8. The method according to claim 1, wherein the edge pre-treatment step is selected from the group consisting of a chemical treatment, a mechanical treatment, a temperature treatment, and any combinations thereof.

9. The method according to claim 1, wherein the edge pre-treatment step comprises etching with an acidic solution.

10. The method according to claim 9, wherein the acidic solution comprises, in aqueous solution, a compound selected from the group consisting of HF, $H_2SO_4$, HCl, $NH_4HF_2$, and any combinations thereof.

11. The method according to claim 9, wherein the acidic solution comprises a concentration of Hydrogen ions of less than 25 mol/L.

12. The method according to claim 1, wherein the edge pre-treatment step comprises a laser treatment.

13. The method according to claim 1, wherein the edge pre-treatment step comprises a polishing treatment.

14. The method according to claim 13, where the polishing treatment comprises forming a stack of several ultrathin glass sheets and applying the polishing treatment to a side of the stack of ultrathin glass sheets relative to the stacking direction.

15. The method according to claim 1, further comprising providing the ultrathin glass sheet with an essentially rectangular shape having rounded corners with a corner radius of equal or less than 20 mm.

16. The method according to claim 15, wherein the edge pre-treatment is applied to regions on the first surface and/or second surface bordering the rounded corners.

17. The method according to claim 1, further comprising providing the ultrathin glass sheet with at least one hole, the at least one hole being circular or essentially rectangular with rounded corners.

18. The method according to claim 17, wherein the edge pre-treatment is applied to regions on the first surface and/or second surface bordering the rounded corners.

19. The method according to claim 1, wherein the ultrathin chemically toughened glass article is an ultrathin glass sheet.

20. An ultrathin chemically toughened glass article produced by the method according to claim 1.

21. The ultrathin chemically toughened glass article according to claim 20, comprising a depth of an ion-exchange layer DoL ($L_{DoL}$) that is less than 30 μm, a surface compressive stress CS ($\sigma_{cs}$) that is between 100 MPa and less than 600 MPa, and a central tensile stress CT ($\sigma_{CT}$) that is less than 120 MPa, wherein the thickness t, DoL, CS and CT of the toughened ultrathin glass article meet the relationship $$\frac{0.2t}{L_{DoL}} \leq \frac{\sigma_{CS}}{\sigma_{CT}}.$$

22. The ultrathin chemically toughened glass article according to claim 20, further comprising a bending having radius of 150 mm or less.

23. The ultrathin chemically toughened glass article according to claim 20, comprising a flexural strength of 200 MPa or more.

24. A method for producing an ultrathin chemically toughened glass article, comprising:

providing an ultrathin glass sheet with a first surface and a second surface joined by at least one edge, the ultrathin glass sheet having a thickness between the first and the second surfaces;

chemically toughening the ultrathin glass sheet to produce an ultrathin chemically toughened glass article; and applying a laser pre-treatment to the at least one edge of the ultrathin glass sheet prior to the chemical toughening step in order to reduce and/or blunt edge defects and to increase resistance to breakage of the ultrathin glass sheet during the chemical toughening, wherein the chemically toughening step comprises:

spraying an aqueous potassium salt solution onto the ultrathin glass sheet;

pre-heating the ultrathin glass sheet to evaporate water of the aqueous solution so as to leave the potassium salt on the ultrathin glass sheet, and subsequently moving the ultrathin glass sheet through a toughening furnace, the furnace further heating the ultrathin glass sheet so that an ion exchange for the chemical toughening is promoted.

25. A method for producing an ultrathin chemically toughened glass article, comprising:

providing an ultrathin glass sheet with a first surface and a second surface joined by at least one edge, the ultrathin glass sheet having a thickness between the first and the second surfaces;

chemically toughening the ultrathin glass sheet to produce an ultrathin chemically toughened glass article; and applying an edge pre-treatment to the at least one edge of the ultrathin glass sheet prior to the chemical toughening step in order to reduce and/or blunt edge defects and to increase resistance to breakage of the ultrathin glass sheet during the chemical toughening, wherein the step of comprising etching with an acidic solution having a concentration of Hydrogen ions of less than 25 mol/L, and wherein the chemically toughening step comprises controlling an ion-exchange rate during the chemical toughening to achieve a depth of an ion-exchange layer DoL ($L_{DoL}$) of less than 30 μm, a surface compressive stress CS (σCS) between 100 MPa and 700 MPa, and a central tensile stress CT (σCT) less than 120 MPa, wherein the thickness t, DoL, CS and CT of the ultrathin toughened glass article meet the relationship $$\frac{0.2t}{L_{DoL}} \leq \frac{\sigma_{CS}}{\sigma_{CT}}.$$

26. The method according to claim 25, wherein the chemical toughening includes an ion-exchange in a salt bath between 350-700° C. for 15 minutes to 48 hours.

27. The method according to claim 25, wherein the concentration of Hydrogen ions is less than 5 mol/L.

28. The method according to claim 25, wherein the concentration of Hydrogen ions is less than 1 mol/L.

29. The method according to claim 25, wherein the concentration of Hydrogen ions is less than 0.1 mol/L.

30. A method for producing an ultrathin chemically toughened glass article, comprising:

providing an ultrathin glass sheet with a first surface and a second surface joined by at least one edge, the ultrathin glass sheet having a thickness between the first and the second surfaces;

separating the ultrathin glass sheet from a coiled up glass ribbon having a length of at least 10 meters along a longitudinal direction;

chemically toughening the ultrathin glass sheet to produce an ultrathin chemically toughened glass article; and applying an edge pre-treatment to the at least one edge along the longitudinal direction of the ultrathin glass sheet prior to the chemical toughening step in order to reduce and/or blunt edge defects and to increase resistance to breakage of the ultrathin glass sheet during the chemical toughening, wherein the coiled up glass ribbon has an inner radius chosen so that a innermost layer of the coil is subjected to a tensile stress $A_{app}$, being smaller than:

$$1.15\cdot \mathrm{Min}\left(\tilde{\sigma}_a - \Delta_a 0.4\cdot\left(1-\ln\left(\frac{A_{ref}}{A_{App}}\Phi\right)\right), \tilde{\sigma}_e - \Delta_e 0.4\cdot\left(1-\ln\left(\frac{L_{ref}}{L_{App}}\Phi\right)\right)\right), \tag{1}$$

where $L_{ref}$ being the edge length and $A_{ref}$ being the surface area of the side faces of glass ribbon samples, $\tilde{\sigma}_a$ being the median of the tensile stress of samples of the glass ribbon upon break of the samples in case that the break occurs within a side face of the samples, and $\tilde{\sigma}_e$ being the median of the tensile stress of samples of the glass ribbon upon break of the samples in case that the break emanates from an edge of the samples, $\Delta_e$ and $\Delta_a$ being standard deviations of the tensile stress upon break of the samples at the edge or within a side face of the samples, respectively, $A_{app}$ being the surface area of one side face the glass ribbon and $L_{app}$ being the cumulated edge length of the longitudinal edges of the glass ribbon, and $\Phi$ being a specified maximum rate of breakage within a time interval of at least half a year.

31. The method according to claim 30, wherein the inner radius of the coil is chosen so that the innermost layer of the coil is subjected to a tensile stress $A_{app}$ smaller than $$0.93\cdot \mathrm{Min}\left(\tilde{\sigma}_a - \Delta_a 0.4\cdot\left(1-\ln\left(\frac{A_{ref}}{A_{app}}\Phi\right)\right), \tilde{\sigma}_e - \Delta_e 0.4\cdot\left(1-\ln\left(\frac{L_{ref}}{L_{app}}\Phi\right)\right)\right).$$

32. The method according to claim 30, further comprising choosing a maximum rate of breakage $\Phi$ being less than 0.1.

33. The method according to claim 30, wherein the inner radius of the coil is chosen so that the innermost layer of the coil is subjected to a tensile stress $A_{app}$ of at least 22 MPa.

34. The method according to claim 30, wherein the step of applying the edge pre-treatment to the at least one edge along the longitudinal direction comprises etching the at least one edge along the longitudinal direction prior to forming the coil.

35. The method according to claim 30, wherein the chemically toughening step comprises:

providing a glass ribbon wound to a glass coil;

continuously decoiling the glass coil;

while decoiling, chemically toughening the glass ribbon in a section decoiled from said glass coil; and recoiling the chemically toughened glass ribbon to provide a glass coil.

* * * * *